(12) United States Patent
Chen

(10) Patent No.: US 7,441,747 B2
(45) Date of Patent: Oct. 28, 2008

(54) VACUUM GATE

(75) Inventor: Hwa-Fu Chen, Hsinchu (TW)

(73) Assignee: G-Light Display Corp., Hsinchu (TW)

( * ) Notice: Subject to any disclaimer, the term of this patent is extended or adjusted under 35 U.S.C. 154(b) by 0 days.

(21) Appl. No.: 11/952,701

(22) Filed: Dec. 7, 2007

(65) Prior Publication Data
US 2008/0083897 A1    Apr. 10, 2008

Related U.S. Application Data

(63) Continuation-in-part of application No. 11/183,206, filed on Jul. 18, 2005, now abandoned.

(51) Int. Cl.
*F16K 3/00* (2006.01)
(52) U.S. Cl. ...................... 251/193; 251/326
(58) Field of Classification Search ......... 251/326–329, 251/193
See application file for complete search history.

(56) References Cited

U.S. PATENT DOCUMENTS

| | | | | |
|---|---|---|---|---|
| 5,755,255 A | * | 5/1998 | Iwabuchi | 251/158 |
| 6,082,706 A | * | 7/2000 | Irie | 251/158 |
| 6,299,133 B2 | * | 10/2001 | Waragai et al. | 251/193 |
| 6,390,449 B1 | * | 5/2002 | Ishigaki et al. | 251/193 |
| 6,488,262 B1 | * | 12/2002 | Oka | 251/193 |
| 6,517,048 B2 | * | 2/2003 | Ettinger et al. | 251/167 |
| 2004/0089836 A1 | * | 5/2004 | Wu | 251/326 |

* cited by examiner

*Primary Examiner*—John Bastianelli
(74) *Attorney, Agent, or Firm*—WPAT, P.C.; Anthony King

(57) ABSTRACT

The improved vacuum gate of the present invention is capable of airtight isolation or interconnecting between two vacuum chambers. The improved vacuum gate is based on mechanical mechanism which simplifies the whole vacuum gate structure and provides more practical and economical usage. Two reverse L-shaped of the first guiding trenches are used to guide and allow the gate door of the gate box to move both in vertical and horizontal directions in such that the vacuum gate can air seal the vacuum chambers and provide enough force to open and close the vacuum chambers even when the vacuum pressure is increased or when the difference in thrust pressure is increased between the two vacuum chambers. Further, different types of the tubes and bellows can be used in the improved vacuum gate depended on the application of the vacuum gate in the different conditions of the gate valve close-open cycles.

16 Claims, 21 Drawing Sheets

VACUUM GATE

CROSS-REFERENCE TO RELATED APPLICATIONS

This application is a Continuation in part of U.S. patent application Ser. No. 11/183,206, filed on Jul. 18, 2005, now pending, which is hereby incorporated by reference in its entirety.

Although incorporated by reference in its entirety, no arguments or disclaimers made in the parent application apply to this divisional application. Any disclaimer that may have occurred during the prosecution of the above-referenced application(s) is hereby expressly rescinded. Consequently, the Patent Office is asked to review the new set of claims in view of all of the prior art of record and any search that the Office deems appropriate.

1. Field of Invention

The present invention relates to a vacuum gate valve, and more particularly to an improved vacuum gate capable of airtight isolating or interconnecting two vacuum chambers.

2. Description of the Related Art

A vacuum gate plays an important role in many types of equipment that adopt the vacuum technology, and these equipments include film manufacturing process equipments for organic, metal or semiconductor materials and relate to a high vacuum system or an ultra-high vacuum system that controls the properties of the surface of a material. The main function of the vacuum gate valve is to provide an airtight valve between two vacuum cambers. If a valve is opened to interconnect two vacuum chambers, matters or fluids can be transmitted between two vacuum chambers through a vacuum gate valve. Individual vacuum chambers may have different internal pressures according to the requirements of a manufacturing process or a vacuum system so that there is pressure difference between two vacuum chambers. In general, the pressure difference thrust exerted on a valve is directly proportional to the effective area of the valve.

If the effective area of a valve is $1\ m^2$, then the pressure difference thrust exerted on the valve will exceed 10000 Kg. Therefore, a valve has to overcome a very high pressure difference thrust when the valve is closed and exerted by a negative pressure. Furthermore, a vacuum gate valve is usually used together with a valve box connected to two vacuum chambers, and the O-ring disposed at the internal valve contact surface of the valve and the valve box is used to seal the valve and the valve box. If the valve is opened, the valve has to move horizontally to be separate from the internal valve contact surface of the valve box, and then the valve will move vertically to complete the opening process of valve, so as to avoid the O-ring from being worn out or damaged during its vertical movement. Similarly, if the valve is closed, the valve has to move vertically all the way to the extended horizontal position corresponding to the internal valve contact surface of the valve box, and then move horizontally, so that the internal valve contact surface of the valve and the valve box is sealed to complete the process of closing the valve. The prior art accomplishes the required valve movements as follows in order to make the vacuum gate valve to have the function of repeatedly opening or shutting the valve.

FIG. 1A is a schematic view of a wedge vacuum gate valve, and FIG. 1B is another schematic view of a valve of the wedge vacuum gate valve, the wedge vacuum gate valve includes a first, a second and a third pneumatic cylinders 1, 2 and, and a valve 4 linked with a pneumatic cylinder which is comprised of a wedge push board 5 and a latch 6. In FIGS. 1A and 1B, the first pneumatic cylinder 1 applies a force in a direction towards the valve 4 to fix the valve 4 into a position, when the valve is shut. By that time, the wedge push board 5 has not pushed the latch 6 yet, and then the second and third pneumatic cylinders 2, 3 continue applying forces in a direction opposite to the valve 4, so that the wedge push board 5 will push the latch 6 outward to complete the process of shutting the valve. The process of opening the valve is simply a reverse process of the abovementioned process. The drawback of the wedge vacuum gate valve resides on that the wedge push board does not apply enough force to the latch board, so that the valve and the valve contact surface of the vacuum chamber are not airtight and thus causing a leakage easily. Furthermore, when the pneumatic cylinder loses its motive power, the shut valve cannot be fastened to an airtight status.

Referring FIGS. 2A & 2B, the schematic views of a parallelogram vacuum gate valve and a valve of a parallelogram vacuum gate valve respectively, the parallelogram vacuum gate valve comprises a pneumatic cylinder 7, a guide track 8 and a valve 9 linked to a pneumatic cylinder 7, and the valve 9 has a latch board 10, a force applying board 11, link rods 12, 13, and pilot wheels 14, 15. In FIGS. 2A and 2B, when the valve is shut, the pneumatic cylinder 7 applies a force vertically in a direction towards the valve 9 to push the valve 9. Now, the latch board 10 is attached with the force applying board 11 by the tensile force of a spring. When the valve 9 is moved vertically, the latch board 10 reaches an end of a guide track 8 first, and then the pneumatic cylinder 7 continues applying a force to drive pilot wheels 14, 15 of the force applying board 11 to a fixed position on the guide track 8. Now, the parallelogram is spread out into a rectangle, the force applying board 11 pushes the latch board 10 transversally outward by the link rods 12, 13, so as to complete the process of shutting the valve. When the valve is opened, the process of opening the valve is simply a reverse process of the aforementioned process. The drawback of the parallelogram vacuum gate valve resides on its insufficient tensile force of the spring, and thus the force applying board cannot be attached to the latch board to return to the guide track, when the valve is opened. As a result, the O-ring will be worn out or damaged easily and the shut valve cannot be fastened into an airtight status when the pneumatic cylinder loses its dynamic force.

Referring to FIG. 3 for the schematic view of a VAT vacuum gate valve, the VAT vacuum gate valve comprises a valve body 16, a bellow 17, 18 and a valve 19 disposed on one side. FIG. 3 illustrates a driving mechanism of the valve body installed in the VAT vacuum gate valve, and the driving mechanism includes a complicated combination of a gear, a ruler and a link rod. If the valve is opened, a semicircular groove on a rack will be pivotally coupled with a transmission rod that is pivotally coupled with a link rod and has a gear to prevent the valve from dropping. Now, the bellow 17, 18 is in a contracted status with a smaller length. As shown in FIG. 3, if the valve is closed, the bellow 17, 18 is in an extended status with a larger length, and the valve body includes a semicircular groove disposed on a rack separately on both sides and pivotally coupled with the transmission rod that is pivotally coupled with the link rod and has a gears to prevent the valve 19 from being opened upward.

Meanwhile, the gear transmission structure becomes very rigid and strong and can prevent gas leakages. As described above, after the mechanism of the VAT vacuum gate valve and the valve are opened or shut, it is not necessary to use a force of the pneumatic cylinder to block the valve for the shutting or opening process, but it uses the design of a gear structure to produce a latch force. However, the VAT vacuum gate valve has to adopt many special designs, such as a specific O-ring.

The O-ring used by VAT is a special one rather than an O-ring of a general application. The VAT creates its own mold for the production, and the shape of its O-ring is in a three-dimensional model, and thus the valve box must have a special internal valve contact surface to fit the special O-ring. In addition, the VAT vacuum gate valves adopt the vacuum feed-through device in the bellow form. The advantage of the feed-through form resides on that the bellow has very low dust content under the vacuum condition, but the cost of the bellow is very high. As described in the above, the VAT vacuum gate valves have to adopt the special O-ring and the corresponding valve box produced by VAT, thus the scope of its applications is restricted.

A conventional Hydraulic Valve Actuation (HVA) valve (not shown in the drawings), which is normally used in the processing chambers of different pressure, comprises a valve housing which has an upper portion and a lower portion coupled together, wherein two gate plates are provided at the bottom part of the upper portion of the valve housing. The gate plates are used as valve doors to seal the valve holes between the vacuum chambers. A plurality of hydraulic actuators is provided and connected to the bottom part of the lower portion of the housing in order to provide mechanism for moving the gate plates up and down movement.

The usage of two gate doors in the valve housing results a limited space within the valve housing, in other words, the HVA valve design has limited applications, such as in the semiconductor devices manufacturing process which has small pressure difference between the chambers. Further, an expansive bellow is required in the HVA valve's design. The HVA valve design is not suitable in an environment when large pressure differentials are being employed, or large chambers are required for large area flat panel display industry.

SUMMARY OF THE INVENTION

It is an object of the present invention to provide an improved vacuum gate that can airtight the vacuum chambers and can open & close the chambers easily even when the thrust pressure on the doors are enormous different pressure between the chambers and outside environment.

It is another object of the present invention to provide an improved vacuum gate that is purely based on mechanical principle and mechanical mechanism that can sustain enormous pressure difference (both in positive and negative pressure differences) and can also provide large force to open and close valve easily.

It is another object of the present invention to provide an improved vacuum gate that can overcome the shortcoming and the default of the conventional vacuum gates, which have insufficient transversal forces to maintain the airtight condition between the vacuum chambers, or between valve and the valve contact surface of the vacuum chamber.

The improved vacuum gate of the present invention utilizes the reverse L-shaped of the first guiding trench to guide and allow the gate door to move both in vertical and horizontal directions in such that the vacuum gate can airtight the vacuum chambers and provide enough force to open and close the vacuum chambers even when the vacuum pressure is increased or when the difference in thrust pressure is increased between the two vacuum chambers. The design in the vacuum gate of the present invention can prevent the O-ring used in the vacuum gate being worn out or damaged. The design of the present invention can also overcome the shortcoming of the prior art that has to adopt a special valve and a special O-ring for limited application. The specific design of the vacuum gate of the present invention can be enlarged and integrated with different gate boxes to accommodate the large chambers. Further, when the pneumatic cylinder lost power, the gate door would be in a self-locked position.

According to a first preferred embodiment of the present invention, the improved vacuum gate comprises a gate box having a storing space and gate door, wherein valve holes are provided at front and rear portions of the gate box, a plurality of first holes is provided at bottom portion of the gate box connecting to the storing space, and valve holes are used respectively to integrate with a vacuum chamber. The gate door is installed at the storing space of the gate box. A plurality of flexible sealed tubes are located at the bottom of the gate box, wherein top portions of the flexible sealed tubes are connected respectively to the bottom portion of the gate box, and the flexible sealed tubes are connected with first holes of the gate box. At least one swinging device is provided at bottom part of the flexible sealed tubes to connect the flexible sealed tubes together, and a second pilot wheel is provided at right and left sides of the swinging device At least one pneumatic cylinder is positioned at the bottom portion of the gate box, wherein a piston rod is coupled to bottom part of the pneumatic cylinder and moves up and down along vertical axis of the pneumatic cylinder. A pair of first supporting boards, located at the bottom portion of the gate box, wherein each of the first support board has a first guiding trench and a second guiding trench, and the first guiding trench comprises a long rectangular shaped of trench in a vertical direction, and at top part of the rectangular shaped of trench is connected to a horizontal trench with chamfered edges in a horizontal direction, the second guiding trench is formed in the horizontal direction and is located at the top of the horizontal trench of the first guiding trench. The second pilot wheels are rolled along the second guiding trench in the horizontal direction. A link structural board, having at least one second hole and a third pilot wheel located on both sides of the second hole, wherein the two third pilot wheels roll respectively within the first guiding trench in the vertical direction and the horizontal trench in the horizontal direction.

A gap is formed at a pivotally coupled portion of a thrust board and backside of the link structural board, wherein a first pilot wheel is located at both sides of the thrust board respectively, and the two first pilot wheels are rolled within the first guiding trench, a piston rod is passed through the second hole and is coupled to one side of the thrust board. A coupled part of the piston rod and thrust board passes a first central line of the two first pilot wheels located both sides of the thrust board. A plurality of transmission rods passing through the first holes, the flexible sealed tubes and the swinging device, wherein top part of the transmission rods are located at the bottom portion of the gate box, and bottom part of the transmission rods are positioned at top portion of the link structural board. The connecting portion of the transmission rod and the link structural board passes a second central line of the two third pilot wheels located at both sides of the link structural board, when the third pilot wheels are rolled inside the horizontal trenches respectively, the first central line is shifted to the front of the second central line, and the gate door closes the valve hole positioned at the front portion of the gate box.

The vacuum gate according to a second preferred embodiment of the present invention comprises a gate box having a storing space, and a gate door, wherein valve holes are provided at front and rear portions of the gate box. A plurality of first holes is provided at bottom portion of the gate box connecting to the storing space, and valve holes are used respectively to integrate with a vacuum chamber. The gate door is installed at the storing space of the gate box. At least one pneumatic cylinder is positioned at the bottom portion of the gate box, wherein a piston rod is coupled to bottom part of the pneumatic cylinder and moves up and down along vertical axis of the pneumatic cylinder. A pair of first supporting boards, located at the bottom portion of the gate box, wherein each of the first support board has a first guiding trench, the first guiding trench comprises a long rectangular shaped of trench in a vertical direction, and at top part of the rectangular shaped of trench is connected to a horizontal trench with chamfered edges in a horizontal direction. A link structural board having at least one second hole and a third pilot wheel located on both sides of the second hole, wherein the two third pilot wheels roll respectively within the first guiding trench in the vertical direction and the horizontal trench in the horizontal direction. A plurality of bellows are provided, wherein top parts of the bellows are connected to respectively to the bottom portion of the gate box and to the first holes, bottom parts of the bellows are connected to top portion of the link structural board.

A gap is formed at a pivotally coupled portion of the thrust board and backside of the link structural board, a first pilot wheel is located at both sides of the thrust board respectively, and the two first pilot wheels are rolled within the first guiding trenches respectively, a piston rod is passed through the second hole and is coupled to one side of the thrust board, a coupled part of the piston rod and thrust board passes through a first central line of the two first pilot wheels located both sides of the thrust board. A plurality of transmission rods, passing through the first holes and the bellows, wherein top part of the transmission rods are located at the bottom portion of the gate box, and bottom part of the transmission rods are positioned at top portion of the link structural board. The connecting portion of the transmission rod and the link structural board passes through a second central line of the two third pilot wheels located at both sides of the link structural board. When the third pilot wheels are rolled within the horizontal trenches respectively, the first central line is shifted to the front of the second central line, and the gate door closes the valve hole positioned at the front portion of the gate box.

The vacuum gate of the present invention can be used to accommodate a large size of chamber based on the same operating principles and design. The number of the pneumatic cylinder used is increased, and the pneumatic cylinders and flexible sealed tubes are connected in parallel in the large size of vacuum gate.

One of objects of the present invention is to provide an improved vacuum gate that different types of flexible sealed tubes or bellows can all be used in between the bottom part of the gate box and the transmission rods for the vacuum effect. The usage of the flexible seal tubes and the bellow is depended on the application of the vacuum gate, when vacuum gate utilized in the condition of the gate valve close-open cycles is less than 100,000 times per year, flexible sealed tubes are recommended as it is cheaper to maintain, whereas, when the application of the vacuum gate in the condition of the close-open cycles is more than 100,000 times per year, bellows are recommended as good quality of bellows has longer life span and there is no need for repairing the O-rings.

Both the forgoing general description and the following detailed description are exemplary and explanatory only and are not restrictive of the invention, as claimed.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the invention. In the drawings.

FIG. 2 B is a schematic view of conventional valve of a parallelogram vacuum gate valve;

DESCRIPTION OF THE PREFERRED EMBODIMENTS

Figure 1A:
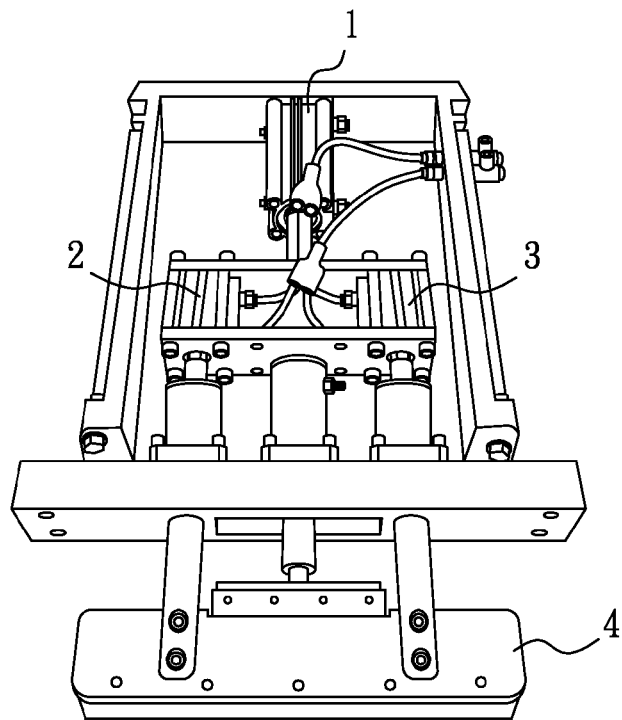
FIG. 1A is a schematic view of a conventional wedge vacuum gate valve.
Figure 1B:
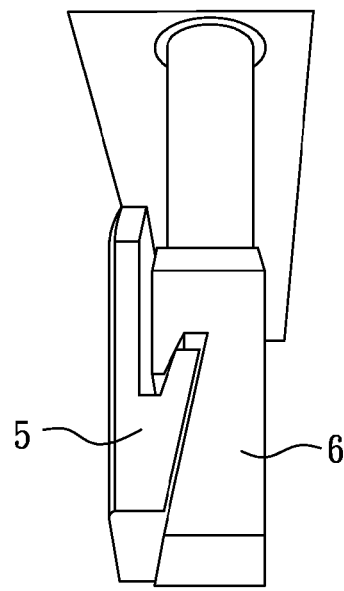
FIG. 1B is another schematic view of a conventional valve of the wedge vacuum gate valve.
Figure 2A:
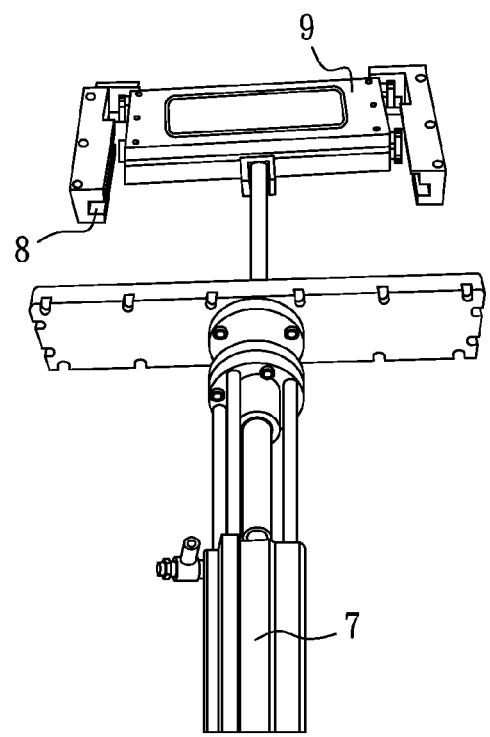
FIG. 2 A is a schematic view of a conventional parallelogram vacuum gate valve.
Figure 2B:
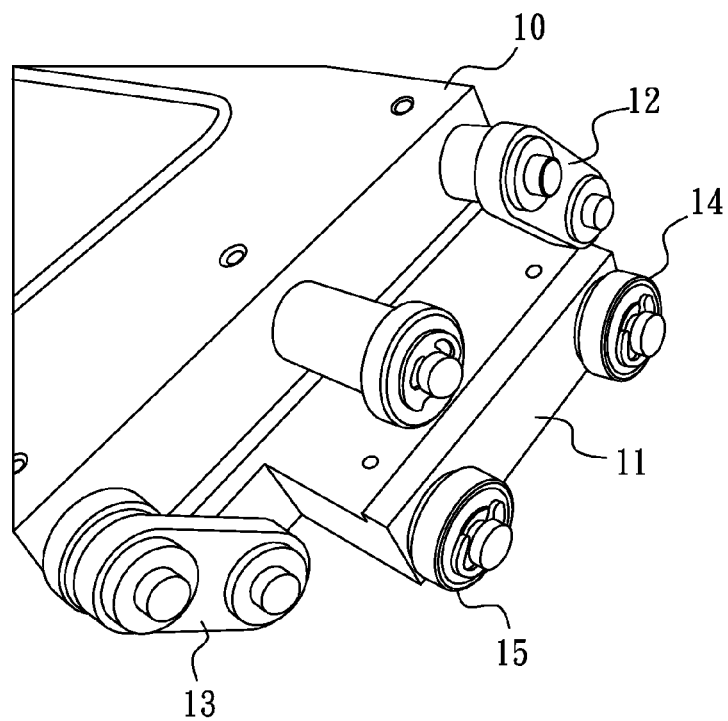
Figure 3:
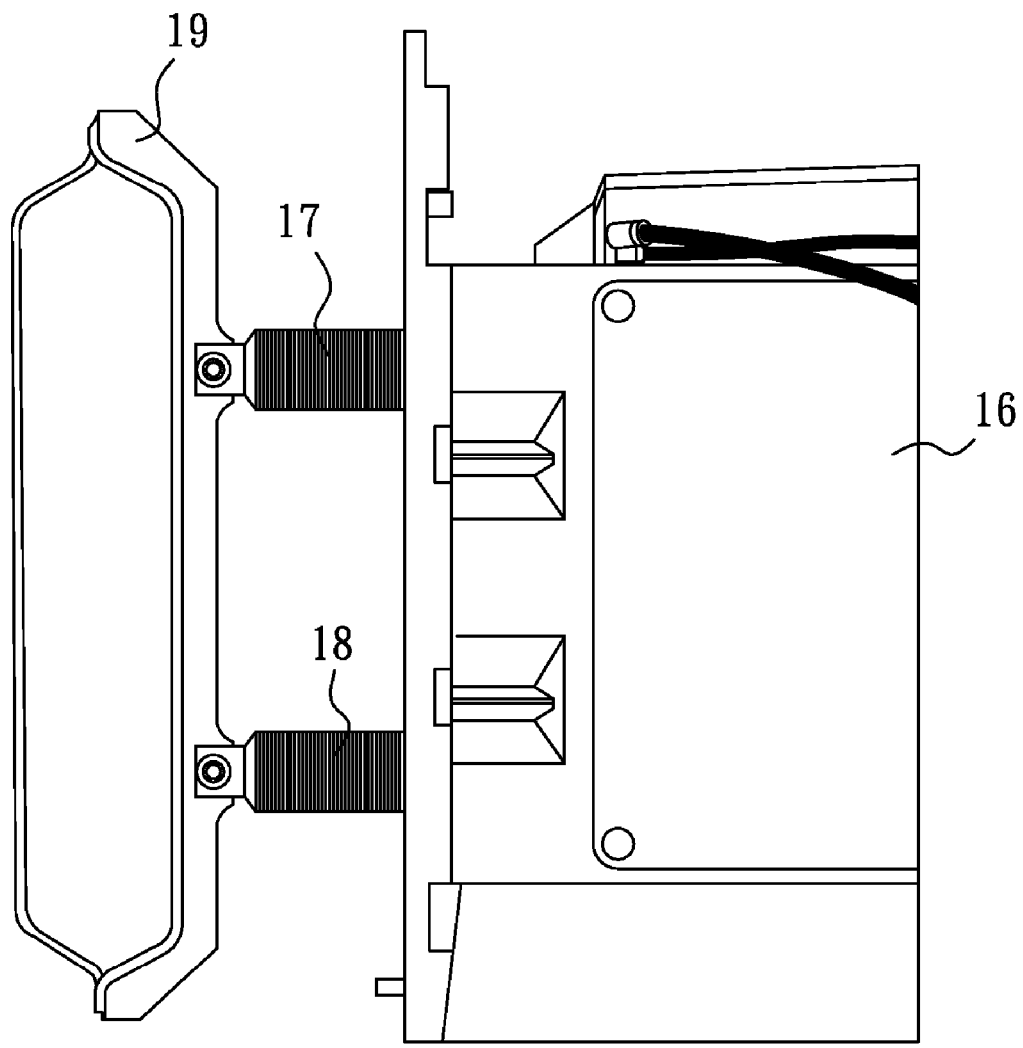
FIG. 3 is a schematic view of a conventional VAT vacuum gate valve.
Figure 4:
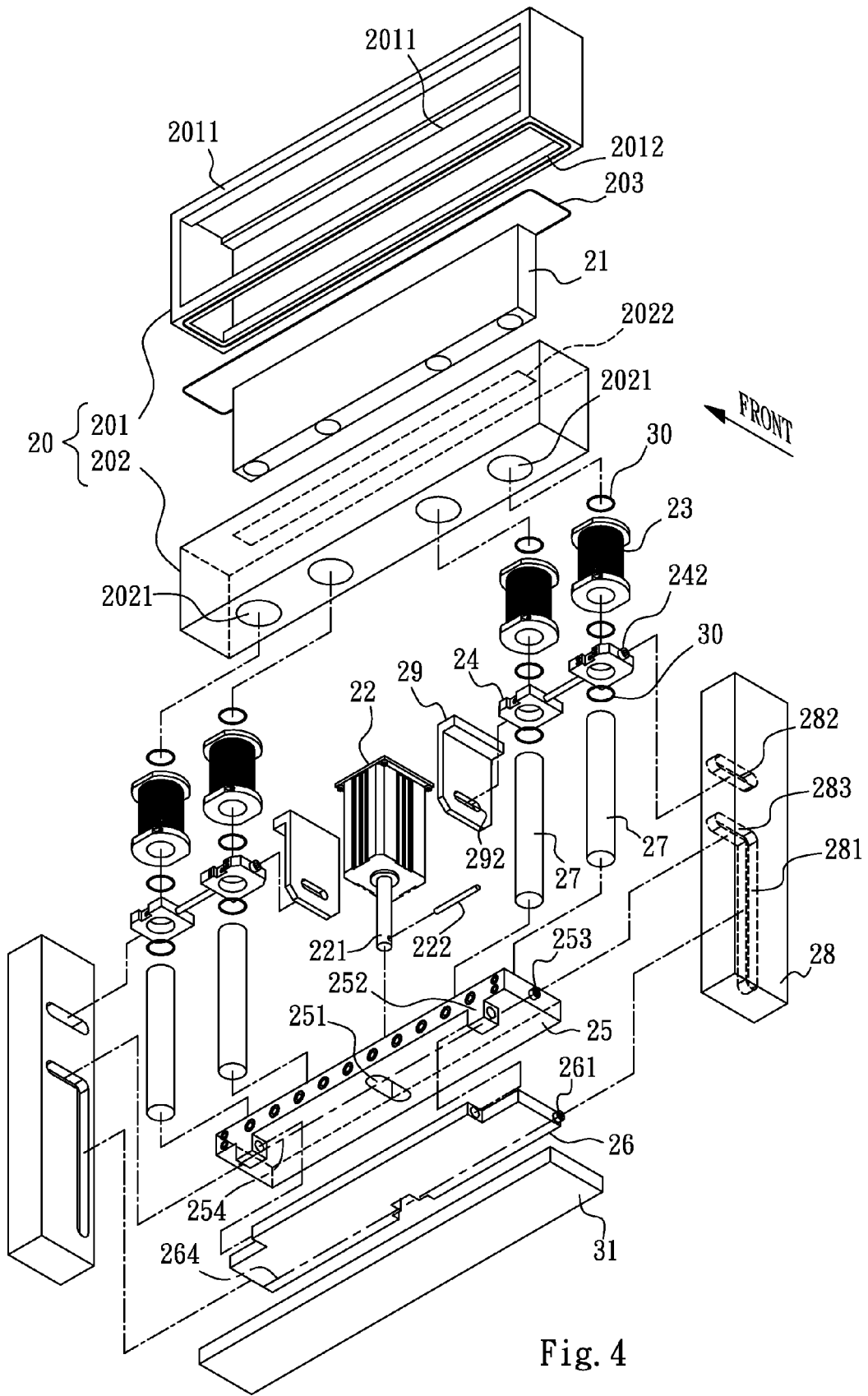
FIG. 4 is a 3 dimensional assembly view of an improved vacuum gate in accordance with a first preferred embodiment of the present invention.
Figure 5:
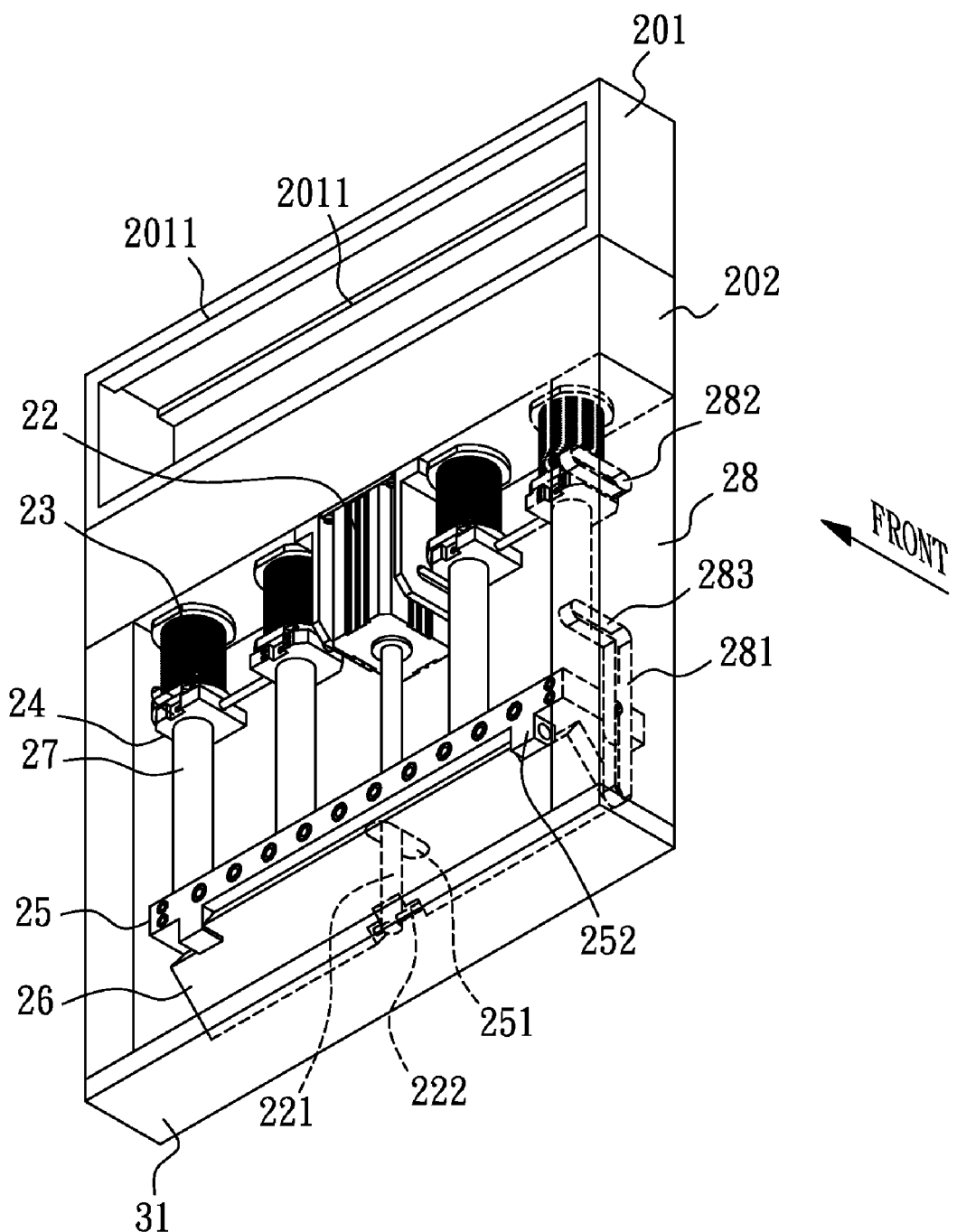
FIG. 5 is a 3 dimensional assembled view of the improved vacuum gate in an open state in accordance with the first preferred embodiment of the present invention.
Figure 6:
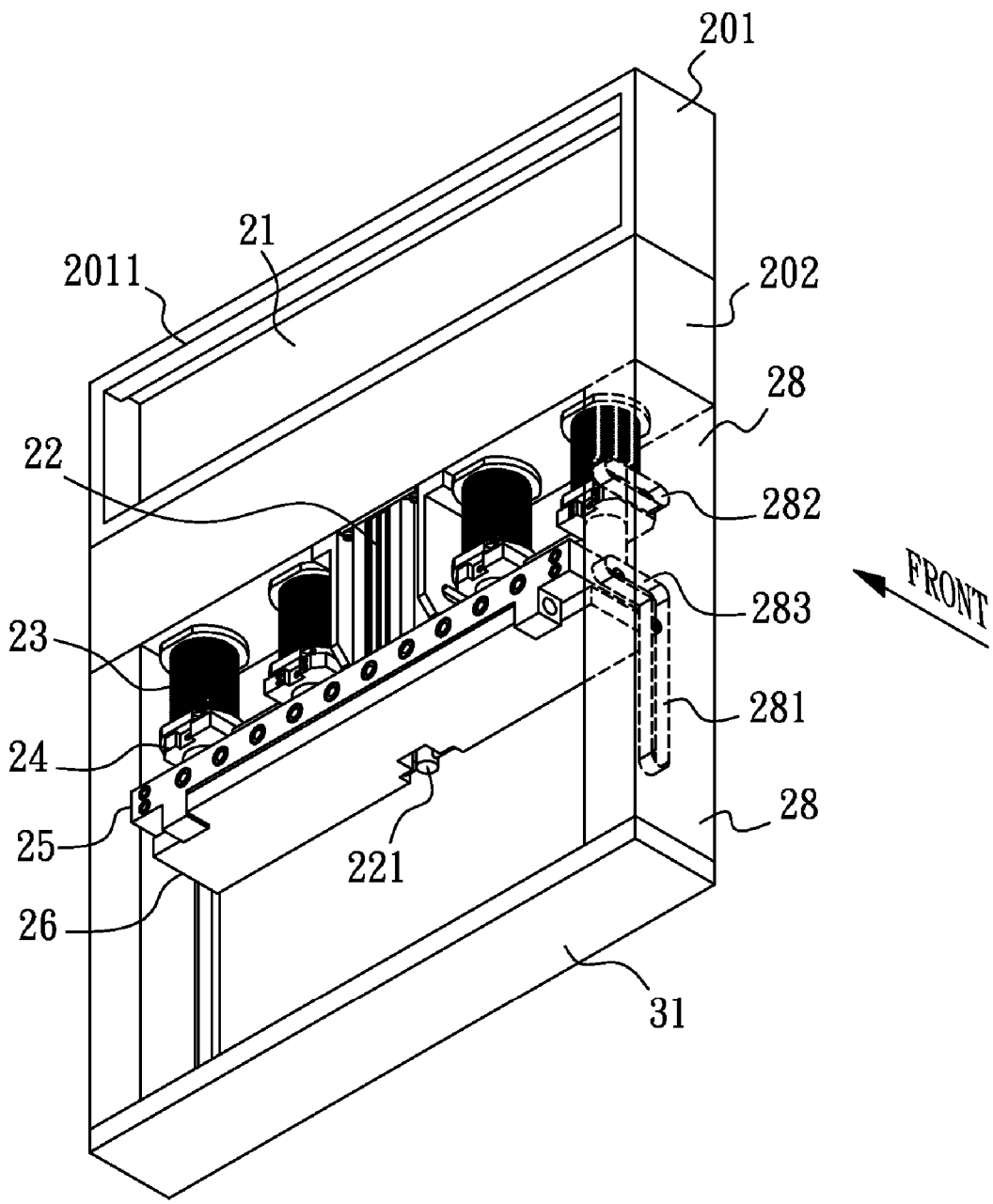
FIG. 6 is 3 dimensional assembled view of the improved vacuum gate in a close state in accordance with the first preferred embodiment of the present invention.

Refer to FIGS. 4-6, assembly views of an improved vacuum gate capable of airtight isolating or interconnecting two vacuum chambers. FIG. 4 illustrates the improved vacuum gate in a first state in accordance with a first preferred embodiment of the present invention. The vacuum gate of the present invention comprises a gate box 20, a gate door 21, a plurality of flexible sealed tubes 23, at least one swinging device 24, at least one pneumatic cylinder 22, a pair of first supporting units 28, a movable board 25, a thrust board 26 and a plurality of transmission roads 27. The gate box 20 further comprises a top body 201 and a bottom body 202, wherein valve hole 2011 is provided at the front and rear portions respectively of the top body 201 shown in FIG. 4, and a connecting top opening 2012 is provided at the bottom portion of the top body 201. A connecting bottom opening 2022 is provided at the top portion of the bottom body 202, and a plurality of first holes 2021 is provided at the bottom portion of the bottom body 202. The connecting top opening 2012 of the top body 201 is integrated with the connecting bottom opening 2022 of the bottom body 202 to form a storing space, and the connecting part of the connecting top opening 2012 and the connecting bottom opening 2022 is sealed with an O-ring 203 to prevent air leakage. Each of the valve holes 2011 is connected to a vacuum unit/chamber (not shown in the drawings). The gate door 21 is located at the storing space of the gate box 20 and is utilized to seal the valve holes 2011. Every top part of the flexible sealed tubes 23 is located to each first hole 2021 provided at the bottom portion of the bottom body 202 of the gate box 20, wherein O-rings 30 are provided in between connecting portions of the flexible sealed tubes 23 and the first holes 2021 of the bottom body 202 to increase the vacuum effect.

At least one set of swinging device 24 is used at the bottom section of the flexible sealed tubes 23 to connect those flexible sealed tubes 23 with each other and a second pilot wheel 242 is provided respectively at right and left sides of the swinging device 24. A pneumatic cylinder 22 is positioned at the bottom portion of the bottom body 202 of the gate box 20, wherein a piston rod 221 is coupled to the pneumatic cylinder 22. The piston rod 221 can move up and down along the vertical axis of the pneumatic cylinder 22. When the volume/pressure of the vacuum is increased (the condition of the vacuum pressure can be negatively or positively), the number of the pneumatic cylinder 22 used in the vacuum gate can be increased to in order to provide enough force so that the gate door 21 to be opened and closed without difficulty. Below the bottom body 202 of the gate box 20, two of first supporting boards 28 are provided, wherein each of the first support board 28 has a first guiding trench 281 and a second guiding trench 282. The first guiding trench 281 comprises a long rectangular shaped of trench 281 connecting to a trench 283 with chamfered edges (rounded edges) formed in a horizontal direction, wherein the horizontal trench 283 is located at the top part of the vertical first guiding trench 281. The second guiding trench 282 is formed in the horizontal direction and is located at the top of the horizontal trench 283. The second pilot wheel 242 is rolled along the horizontal second guiding trench 282. A link structural board 25 comprises at least one second hole 251 and a third pilot wheel 253 located on both sides of the second hole 251, wherein the third pilot wheel 253 can be rolled along the first guiding trench 281 in the vertical direction and the horizontal trench 283 in the horizontal direction. When the number of the pneumatic cylinder 22 is increased, the number of the second hole 251 is also increased.

Figure 15:
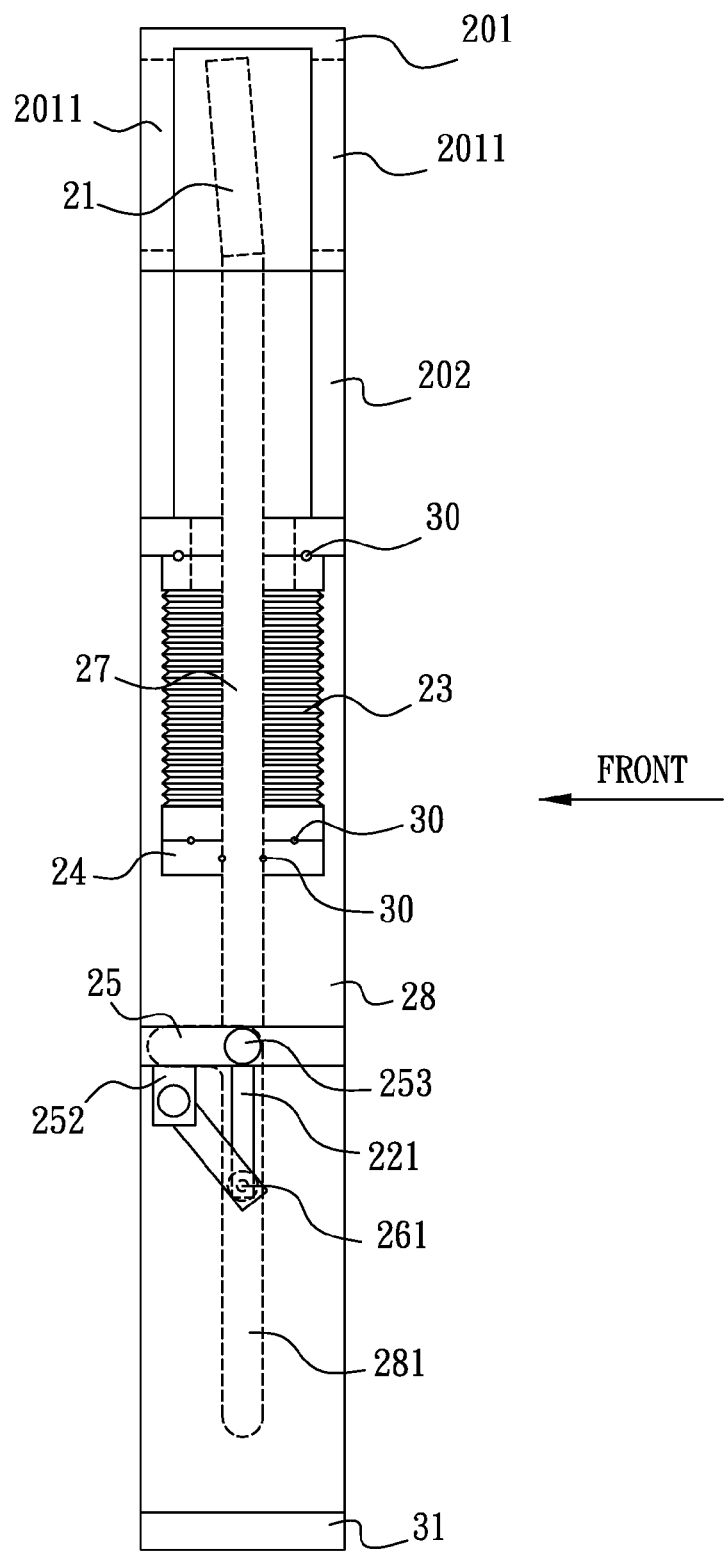
Figure 16:
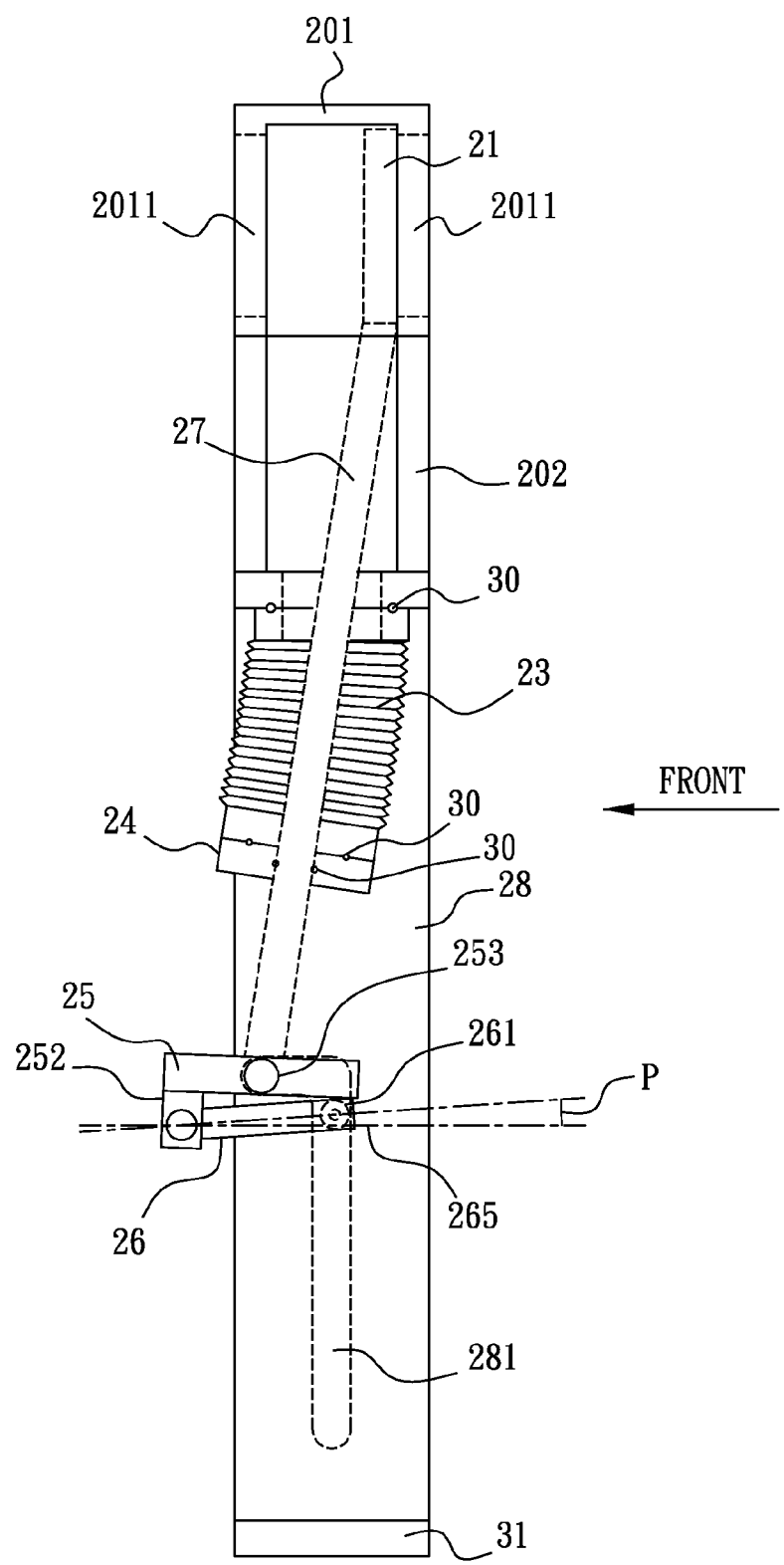

A protruding part 252 is protruded from the bottom part of the link structural board 25, and the protruding part 252 is pivotally coupled to one side of the thrust board 26 in such that the pivotally coupled portion of the thrust board 26 does not contact with the couple portion of the link structural board 25 as shown in FIG. 16. In other words, due to the design of the protruding part 252 of the link structural board 25, a gap is formed in between the thrust board 26 and the link structural board 25 at the pivotally coupled portion of the two boards as shown in FIGS. 15-19, the thrust board 26 is coupled at an angle with respect to the link structural board 25. A first pilot wheel 261 is located at both sides of the thrust board 26 respectively, and the first pilot wheel 261 is rolled and moved along the first guiding trench 281.

The piston rod 221 is passed through the second hole 251 and is coupled to one side of the thrust board 26 via a shaft 222 as shown in FIG. 5, wherein the coupled part between the piston road 221, the thrust board 26 and the shaft 222 passes the first central line 264 of the two first pilot wheels 261 located both sides of the thrust board 26. A transmission rod 27 is used to pass through the first holes 2021, a plurality of flexible sealed tubes 23 and the swinging devices 24 to connect to the gate door 21, in which the top part of the transmission rod 27 is positioned at the bottom portion of the gate door 21, and the bottom part of the transmission rod 27 is located at the top portion of the link structural board 25. The connecting portion between the transmission rod 27 and the link structural board 25 passes at the second central line 254 of the two third pilot wheels 253 located at both sides of the link structural board 25. When the third pilot wheels 253 are rolling within the horizontal trenches 283, the vacuum gate is in a close position. The first central line 264 is shifted in front of the second central line 254, and the gate door 21 seals the valve hole 2011 positioned at the front part of the gate box 20. The bottom parts of the first supporting boards 28 are connected to a connecting board 31 in order to increase the strength and hardness of the vacuum gate of the present invention.

Further, when the vacuum pressure is increased within the vacuum chamber, the number of the transmission rods 27 utilized in the vacuum gate is increased. When the number of the transmission rods 27 is increased, the number of the first holes 2021 and the flexible sealed tubes 23 is also increased in order to provide enough force to open and close the gate door 21. When more than two of the swinging devices 24 are utilized, a plurality of second supporting boards 29 is required to balance both sides of the swinging devices 24, wherein the second supporting boards 29 are located at the bottom part of the bottom body 202 of the gate box 20. A supporting trench 292 is provided at each second supporting board 29 respectively, wherein the supporting trench 292 is formed in a horizontal direction in respect of the second supporting board 29. The second pilot wheels 242 of the swinging devices 24 are rolled within the supporting trench 292 of the second supporting board 29.

Figure 7:
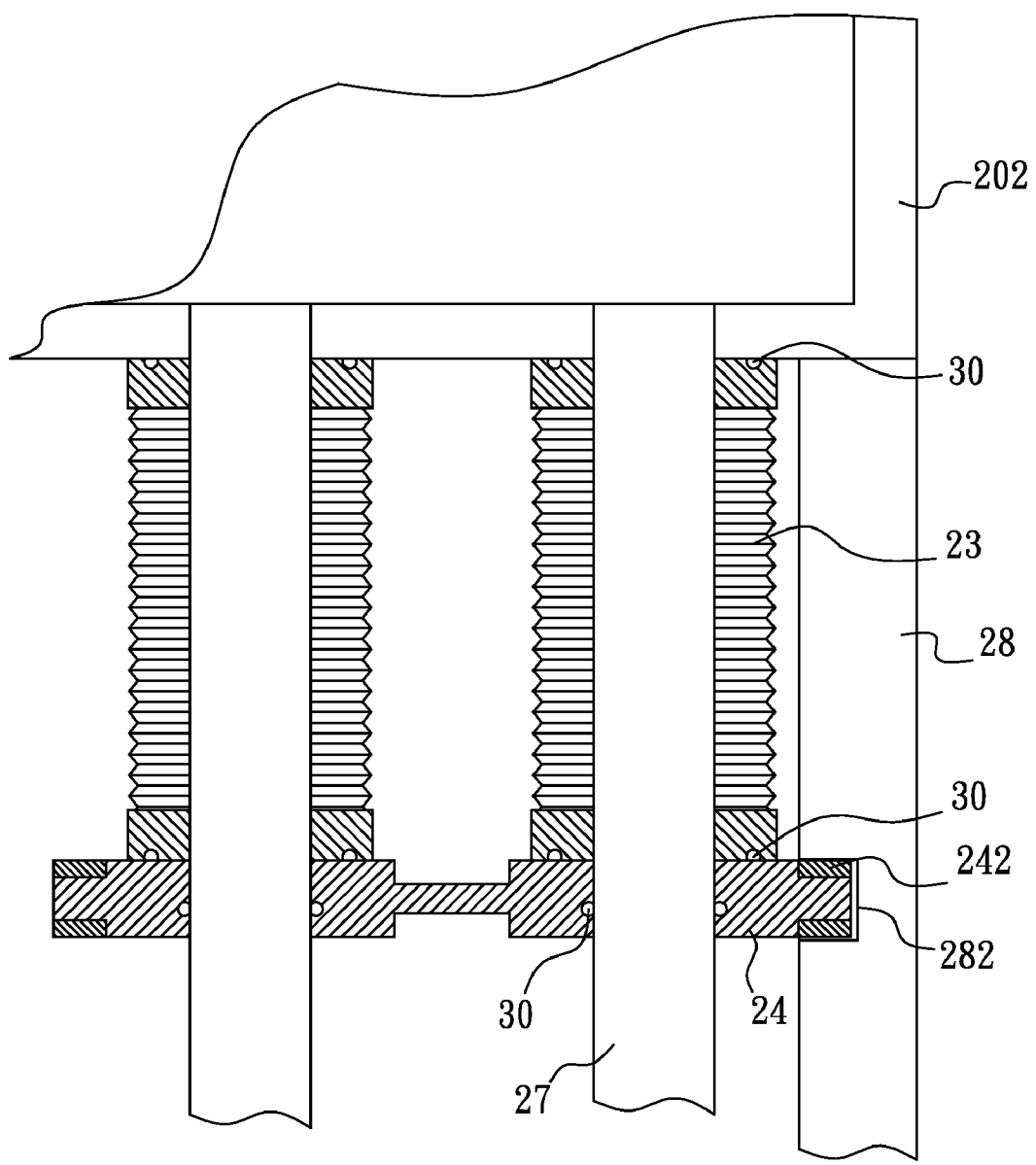
FIGS. 7-9 show schematic views of the utilization of the flexible sealed tubes 23 in states 1, 2 and 3 in accordance with the first preferred embodiment of the present invention.
Figure 8:
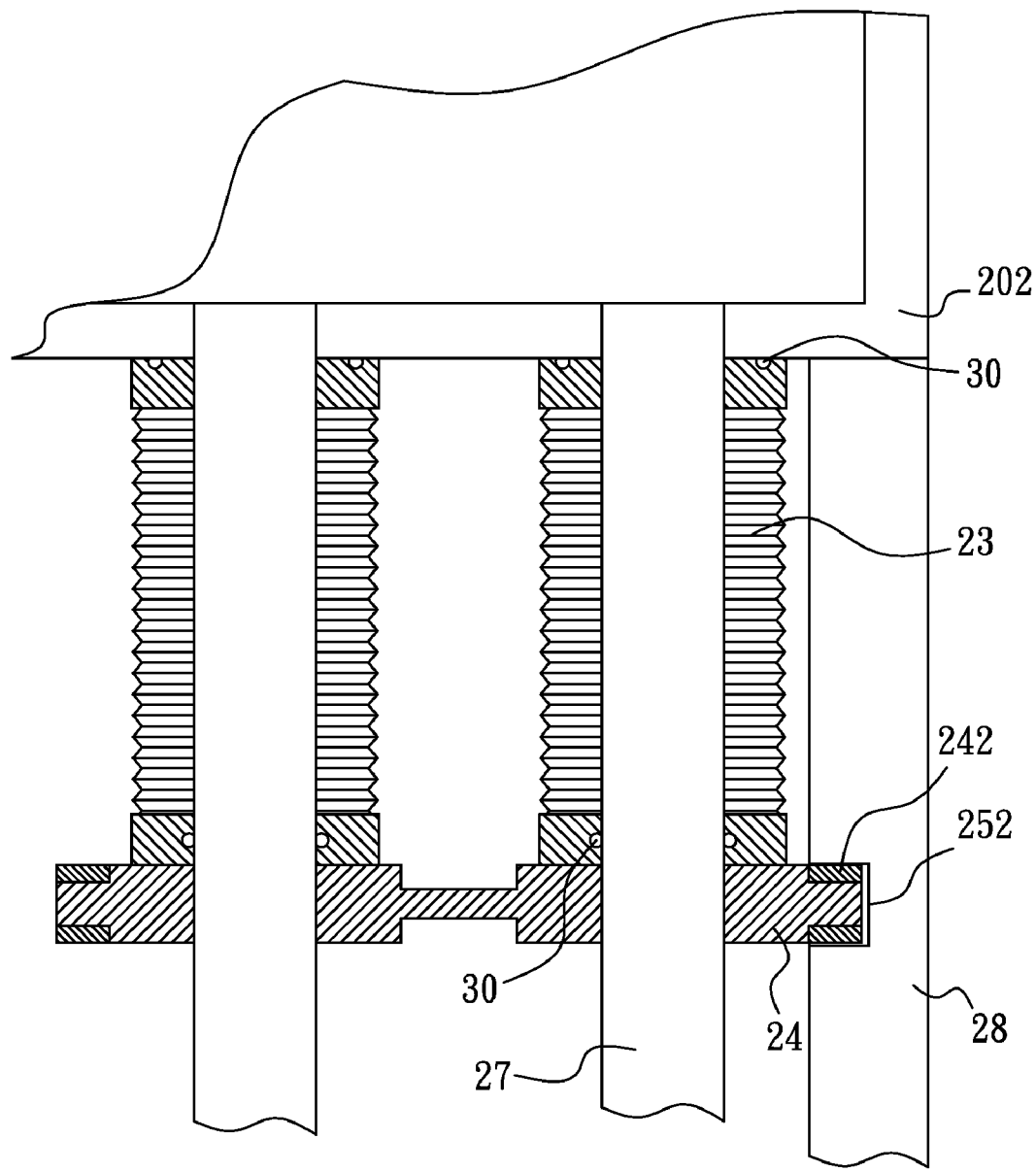
Figure 9:
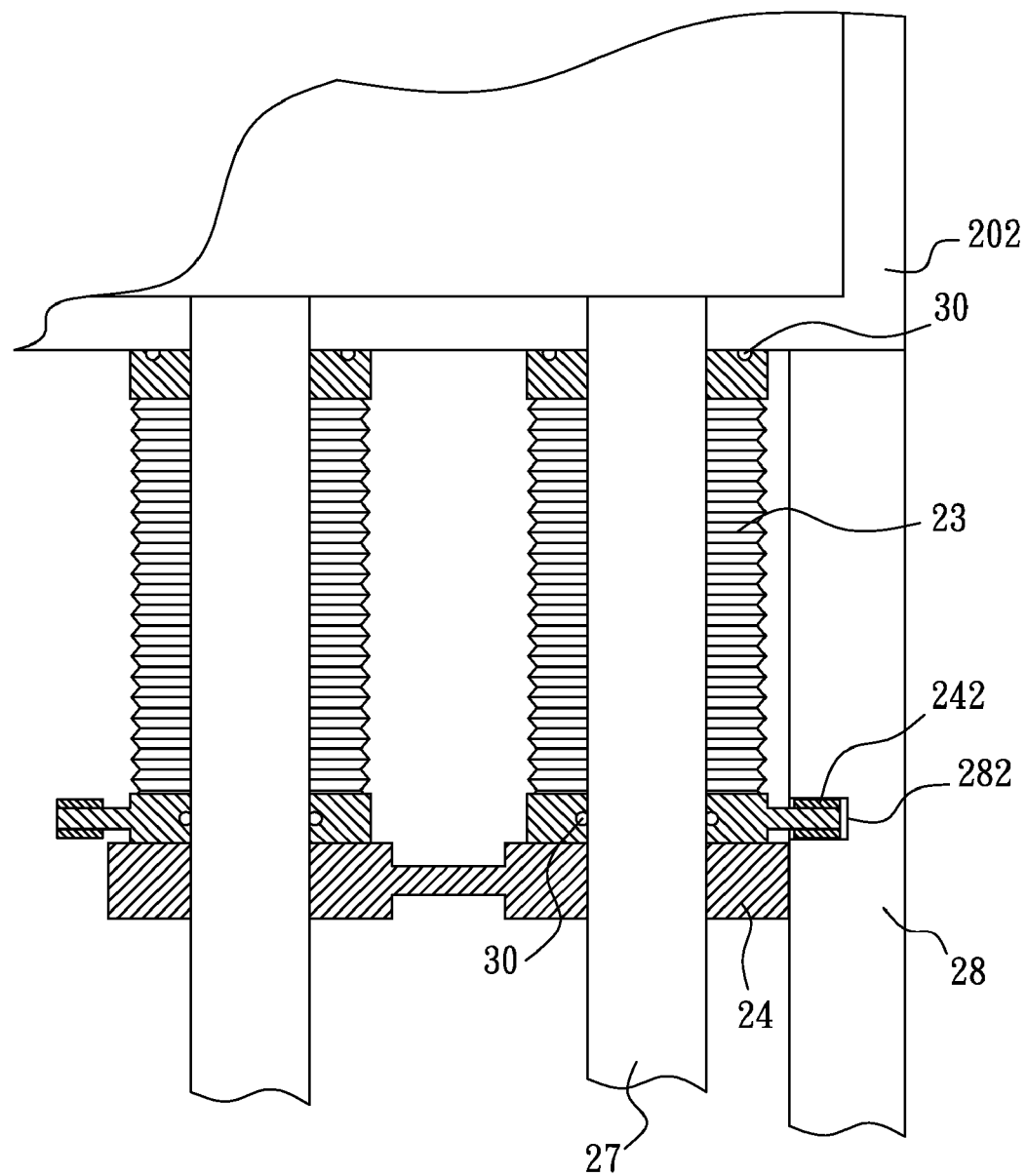

FIGS. 7-9 show the schematic views of the utilization of the flexible sealed tubes 23 in accordance with the first preferred embodiment of the present invention. The vacuum gate of the present invention utilizes three types of the flexible sealed tubes 23 to increase the airtight effect at the bottom part of the flexible sealed tubes 23 of the gate box 20. FIG. 7 shows the first type of the flexible sealed tubes 23 used in the first preferred embodiment, O-rings 30 are provided at the bottom part of the flexible sealed tubes 23 connected to the swinging devices 24, the connected portion of the swinging devices 24 and the transmission rods 27. FIG. 8 illustrates the second type of the flexible sealed tubes 23 used in the present invention, the O-rings 30 are provided at the connecting portion of the flexible sealed tubes 23 and the transmission rods 27. FIG. 9 demonstrates the third type of the flexible sealed tubes 23, the O-rings 30 are provided at the connecting part of the bottom portion of the flexible sealed tubes 23 and the transmission rods 27, wherein the swinging devices 24 are used only for connecting with each other at the bottom part of the flexible sealed tubes 23, and the second pilot wheels 242 are altered to use at the sides of bottom part of the flexible sealed tubes 23.

Figure 10:
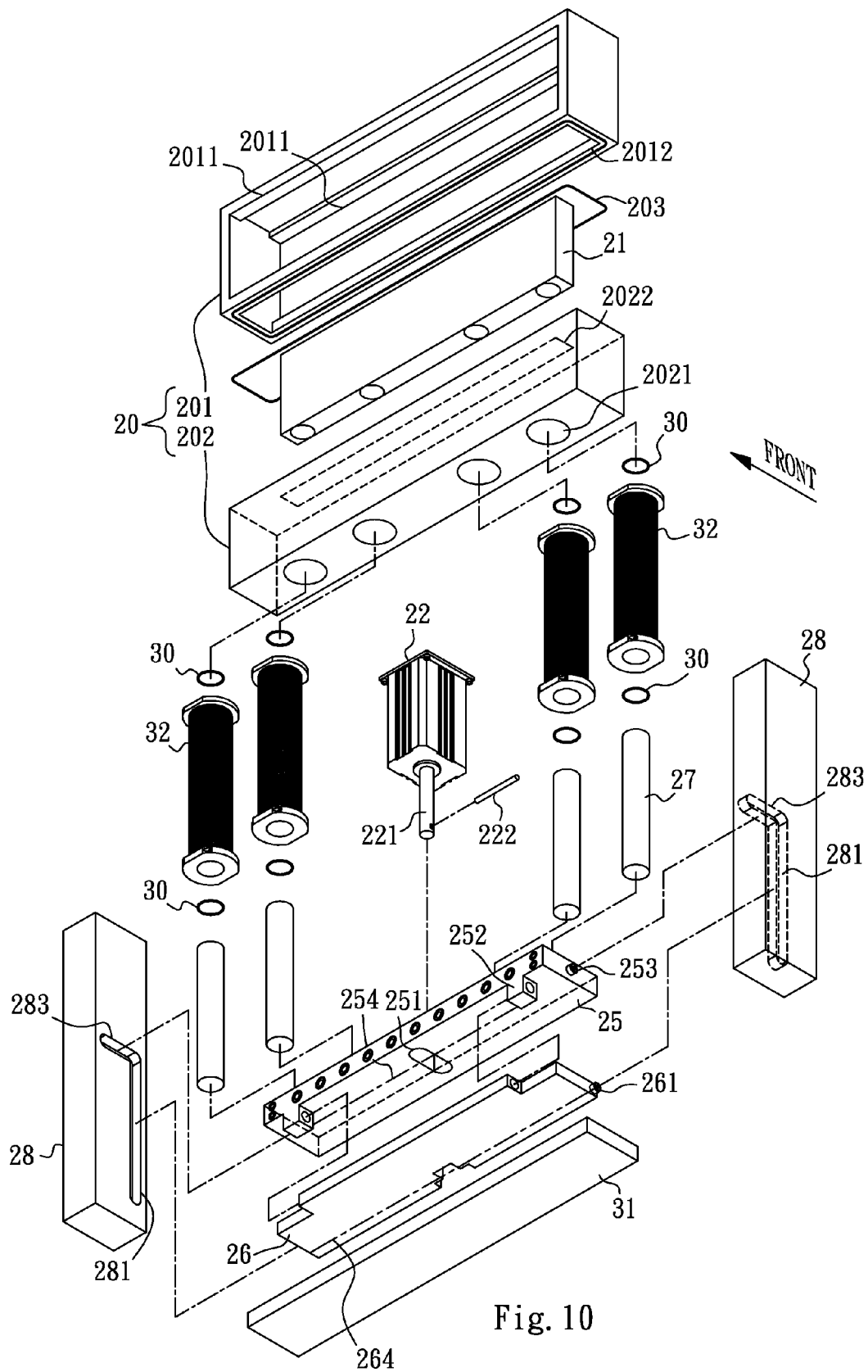
FIG. 10 is a 3 dimensional assembly view of an improved vacuum gate in accordance with a second preferred embodiment of the present invention.
Figure 11:
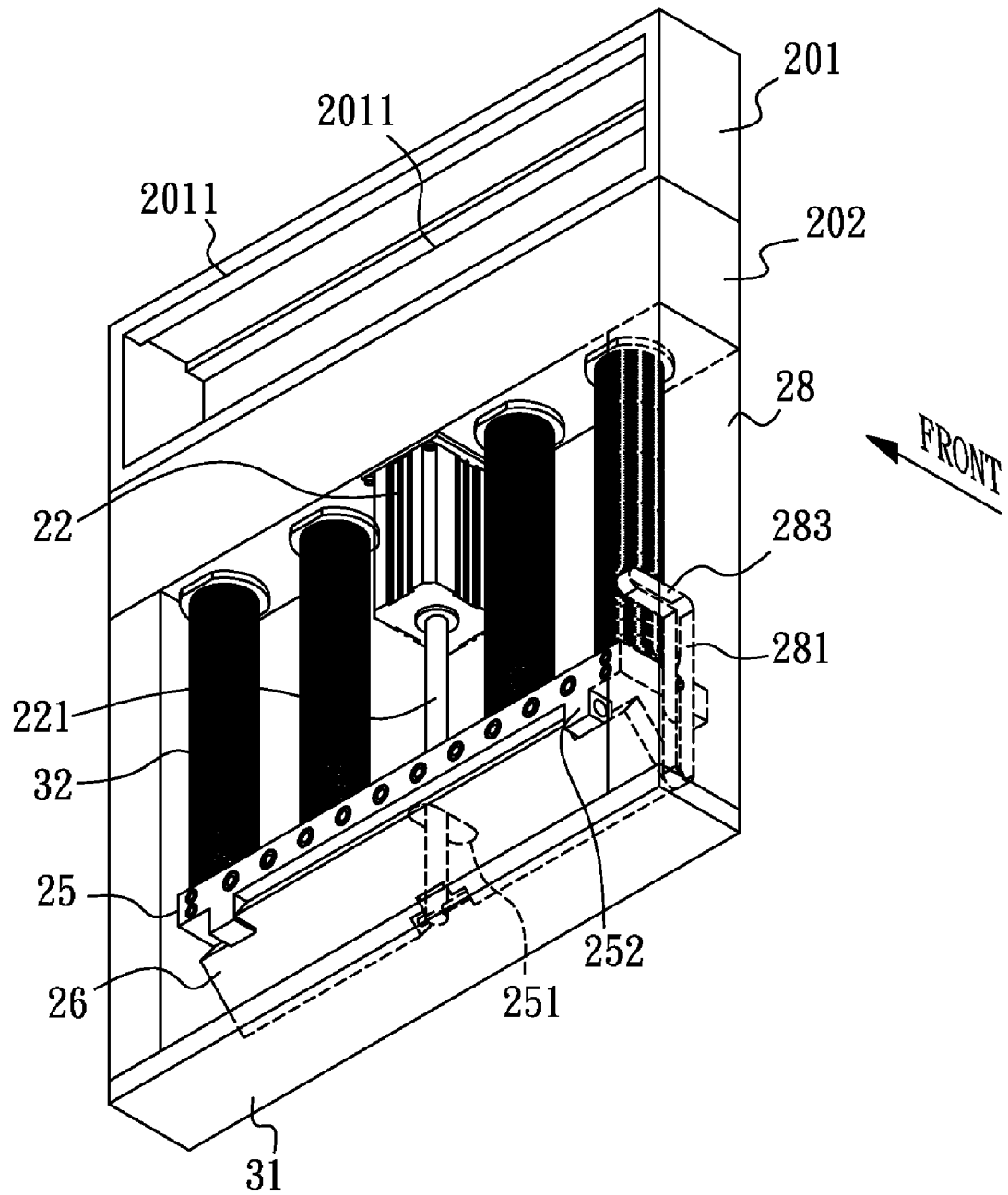
FIG. 11 is a 3 dimensional assembled view of the improved vacuum gate in an open state in accordance with the second preferred embodiment of the present invention.
Figure 12:
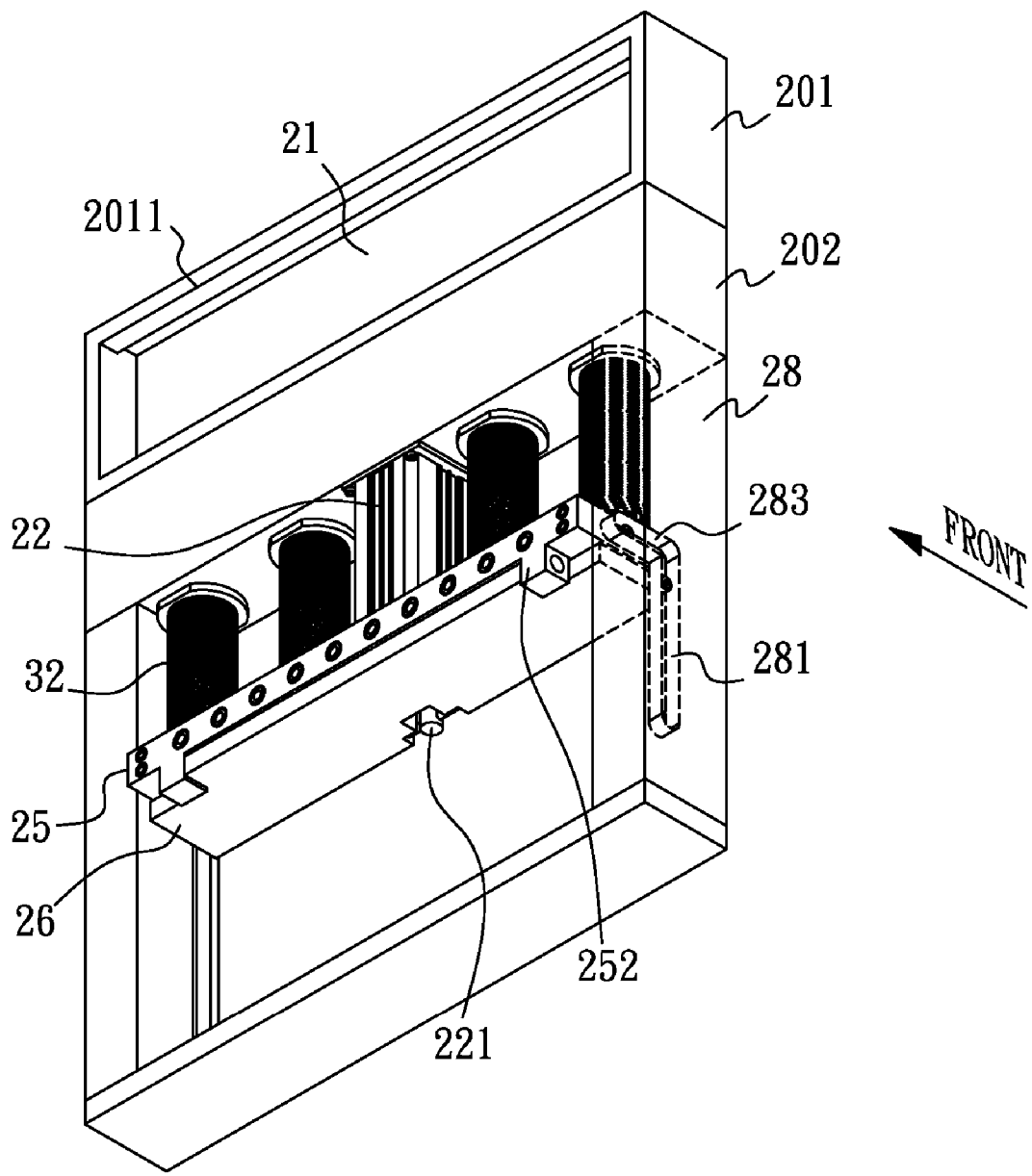
FIG. 12 is a 3 dimensional assembled view of the improved vacuum gate in a close state in accordance with the second preferred embodiment of the present invention.
Figure 13:
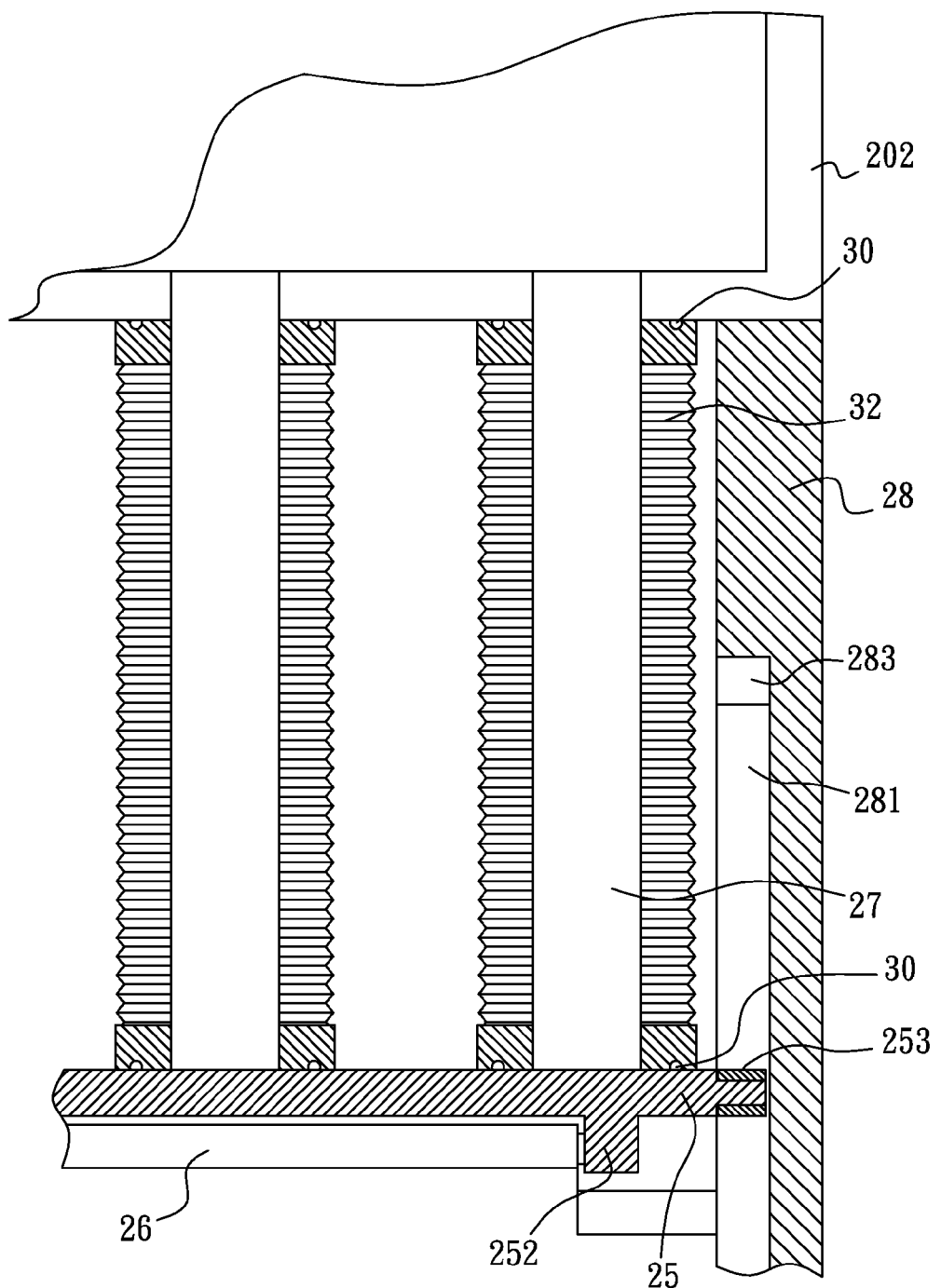
FIG. 13 shows a schematic view of the utilization of the bellows 32 in accordance with the second preferred embodiment of the present invention.

FIGS. 10-13 schematic views demonstrate the operations of the vacuum gate in accordance with a second preferred embodiment of the present invention. The vacuum gate of the second preferred embodiment of the present invention comprises a gate box 20, a gate door 21, a plurality of bellows 32, at least one pneumatic cylinder 22, a pair of first supporting units 28, a movable board 25, a thrust board 26 and a plurality of transmission roads 27. The gate box 20 further comprises a top body 201 and a bottom body 202, wherein valve hole 2011 are provided at the front and rear portions of the top body 201 as shown in FIG. 10, and a connecting top opening 2012 is provided at the bottom portion of the top body 201. A connecting bottom opening 2022 is provided at the top portion of the bottom body 202, and a plurality of first holes 2021 are provided at the bottom portion of the bottom body 202. The connecting top opening 2012 of the top body 201 is integrated with the connecting bottom opening 2022 of the bottom body 202 to form a storing space, and the connecting part of the connecting top opening 2012 and the connecting bottom opening 2022 is sealed with an O-ring 203 to prevent air leakage. Each of the valve holes 2011 is connected to a vacuum unit/chamber (not shown in the drawings). The gate door 21 is located at the storing space of the gate box 20 and is utilized to seal the valve holes 2011. A pneumatic cylinder 22 is positioned at the bottom portion of the bottom body 202 of the gate box 20, wherein a piston rod 221 is coupled to the pneumatic cylinder 22. The piston rod 221 can move up and down along the vertical axis of the pneumatic cylinder 22. When the volume of the vacuum is increased, the number of the pneumatic cylinder 22 used in the vacuum gate can be increased to in order to provide enough force so that the gate door 21 to be opened and closed without much difficulty.

Below the bottom body 202 of the gate box 20, two of first supporting boards 28 are provided, wherein each of the first support board 28 has a first guiding track 281. The first guiding trench 281 comprises a long rectangular shaped of trench 281 connecting to a trench 283 with chamfered edges (rounded edges) formed in a horizontal direction. A link structural board 25 comprises at least one second hole 251 and a third pilot wheel 253 located on both sides of the second hole 251, wherein the third pilot wheel 253 can be rolled within the first guiding trench 281 in the vertical direction and the horizontal trench 283 in the horizontal direction.

When the number of the pneumatic cylinder 22 is increased, the number of the second hole 251 is also increased. The top parts of the bellows 32 are located at the bottom part of the bottom body 202 of the gate box 20 as shown in FIG. 10 and are connected to the first holes 2021 respectively, wherein O-rings 30 are provided at the connecting parts of the top parts of the bellows 32 and the bottom part of the bottom body 202 of the gate box 20 to increase the airtight effect. The bottom parts of the bellows 32 are positioned at the top part of the link structural board 25, and the O-rings 30 are provided at the connecting parts of the bottom parts of the bellows 32 and the top part of the link structural board 25 to enforce the airtight effect.

A protruding part 252 is protruded from the bottom part of the link structural board 25 for coupling to the backside of the thrust board 26, and the protruding part 252 is pivotally coupled to the backside of the thrust board 26 in such that the pivotally coupled portion of the thrust board 26 does not in contact with backside of the link structural board 25 as shown in FIG. 16. In other words, due to the design of the protruding part 252 of the link structural board 25, a gap is formed in between the thrust board 26 and the link structural board 25 at the pivotally coupled portion of the two boards as shown in FIGS. 15-19 when the two boards are integrated, the thrust board 26 is coupled at a predetermined angle with respect to the link structural board 25. A first pilot wheel 261 is located at both sides of the thrust board 26 respectively, and the first pilot wheel 261 is rolled and moved along the first guiding trench 281.

The piston rod 221 is passed through the second hole 251 and is coupled to the front side of the thrust board 26 via a shaft 222 as shown in FIG. 10, wherein the coupled part between the piston road 221, the thrust board 26 and the shaft 222 passes the first central line 264 of the two first pilot wheels 261 located both sides of the thrust board 26. A transmission rod 27 is used to pass through the first holes 2021 and the bellows 32 to connect to the gate door 21, in which the top part of the transmission road 27 is positioned at the bottom portion of the gate door 21, and the bottom part of the transmission rod 27 is located at the top portion of the link structural board 25. The connecting portion between the transmission rod 27 and the link structural board 25 passes the second central line 254 of the two third pilot wheels 253 located at both sides of the link structural board 25. When the third pilot wheels 253 are rolling within the horizontal trenches 283, the vacuum gate is in a close position. The first central line 264 is shifted in front of the second central line 254, and the gate door 21 seals the valve hole 2011 positioned at the front part of the gate box 20. The bottom parts of the first supporting boards 28 are connected to a connecting board 31 in order to increase the strength and hardness of the vacuum gate of the present invention.

Further, when the vacuum pressure is increased within the vacuum chamber, the number of the transmission rods 27 utilized in the vacuum gate is increased. When the number of the transmission rods 27 is increased, the number of the first holes 2021 and the flexible sealed tubes 23 is also increased in order to provide enough force to open and close the gate door 21.

The vacuum gate of the present invention is designed in such that the different types flexible sealed tubes 23 or bellows 32 can all be used in between the bottom part of the gate box 20 and the transmission rods 27 for the vacuum effect. Both of the usage the flexible sealed tubes 23 in the first preferred embodiment and the bellows 32 in the second preferred embodiment have their advantages and disadvantages.

The usage of the flexible sealed tubes 23 in the first preferred embodiment is because its low fabrication cost, compared the cost of the flexible sealed tubes 23 to the bellows 32, the cost of flexible sealed tubes 23 is approximately 10 times less than the bellows 32. However, the flexible sealed tubes 23 offer only bending flexibility without the stretching and compressing capability (refer to FIG. 16). Therefore, the O-rings 30 are needed for the airtight contact with the transmission rods 27 in order to seal off the gate box 20. Further, the O-rings 30 used in the vacuum gate are usually worn out after ten thousand gate valve open-close cycles. Thus, the maintenance cost of replacing the O-rings 30 will be increased even though the O-rings 30 are rather cheap. The frequency of open-close cycles of the gate valve will determine how often the O-rings 30 are needed to be repaired.

On the other hand, the bellows 32 in the second preferred embodiment can be used to cover the exposed portion of the transmission rods 27 outside the gate box 20 in the whole open-close cycle by stretching and compressing their length. Therefore, the O-rings 30 are not required in this application; as a result, the replacement cost of the O-rings 30 does not occur. However, the bellows 32 have a high manufacturing cost and the life span of stretching-compressing is limited. The quality of the bellows 32 will directly affect its usage's life span. For most of the bellows 32, leakage will normally occur after 10 to 1,000 thousand times of stretching-compressing cycles, thus, replacement of the bellow is required after the 10 thousand times of stretching & compressing cycles. The bellows 32 are very expensive. Although the usage of bellows 32 does not incur the cost of replacing the cheap O-rings 30, however, the bellows 32 has expansive maintenance cost.

Figure 14:
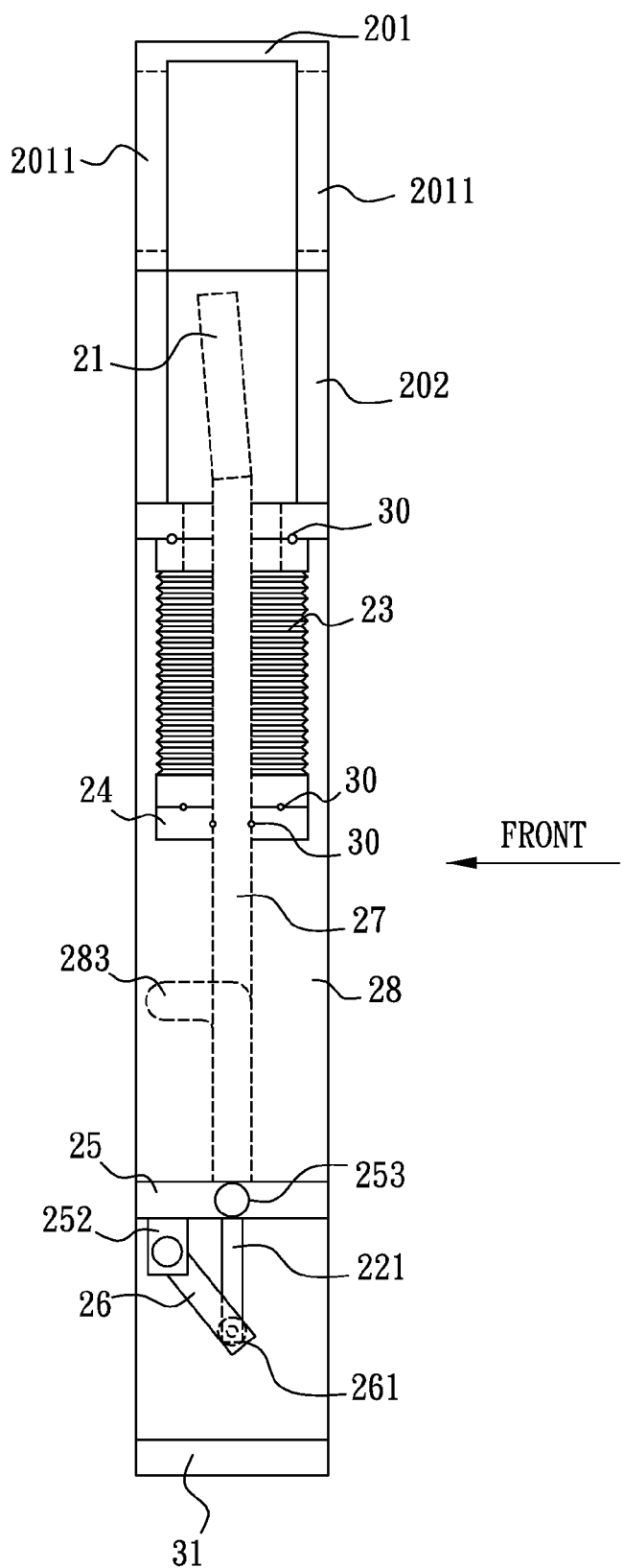
FIGS. 14-16 are schematic views of the operating movement of the vacuum gate at states 1, 2 & 3 in accordance with the first preferred embodiment of the present invention.

FIG. 14 shows the operating movement of the vacuum gate in state 1 in accordance with the first preferred embodiment of the present invention; FIG. 15 shows the operating movement of the vacuum gate in state 2 in accordance with the first preferred embodiment of the present invention; FIG. 16 shows the operating movements of the vacuum gate in state 3 in accordance with the first preferred embodiment of the present invention. From FIGS. 14-16, when the vacuum gate is in a close state, the piston rod 221 is retrieved by the pneumatic cylinder 22, and the piston rod 221 pulls the front side of the thrust board 26 in order to activate the link structural board 25, the first guiding trench 281 guides the first pilot wheel 261 and the third pilot wheels 253 to allow the thrust board 26 and the link structural board 25 to move upward as shown in FIG. 15, as a result the transmission rod 27 and the gate door 21 will be moved upward simultaneously. Once the third pilot wheels 253 of the link structural board 25 is reached at the top part of the first guiding trench 281, the pneumatic cylinder 22 will continuously to retrieve the piston rod 221.

Refer to FIG. 16, once the third pilot wheels 253 reach the top part of the first guiding trench 281, the upward movement of the piston rod 221 triggers the link structural board 25 to move toward in a rear direction (to the left hand side of FIG. 16) as well as the thrust board 26 moving toward the rear direction due to the pivotally coupled part at the protruding part 252 of the link structural board 25. The third pilot wheels 253 of the link structural board 25 are guided by the horizontal trench 283 in such that the flexible sealed tubes 23 bent backward in an angle to allow the link structural board 25 to shift in the rear direction as shown in FIG. 16. Meanwhile, the transmission rods 27 at the top part of the link structural board 25 are bent forward at a pre-set angle to trigger the gate door 21 to air seal/close the valve holes 2011 of the front section of the gate box 20 in such that the vacuum gate closes the vacuum chambers.

FIGS. 14-16, the gap is created between the coupled portion between the back section of the link structural board 25 and the thrust board 26 when the two boards are assembled together. When the gap between the link structural board 25 and the thrust board 26 is reduced, in other words, the two boards 25 and 26 will be very close to each other when the transmission rods 27 trigger the gate door 21 to close the valve holes in the close state, the central line between the pivotally coupled portion of the protruding part 252 of the link structural board 25 and the thrust board 26 & the two first pilot wheels 261 will form a predetermined angle P with respect to a horizontal line 265 of the pivotally couple portion of the protruding part 252 of the link structural board 25 & the thrust board 26 as shown in FIG. 16. This predetermined angle P is designed in such that when the pneumatic cylinder 22 of the vacuum gate in accordance with the first preferred embodiment of the present invention looses its power, the gate door 21 will be still locked. In other words, when a force is used to move the gate door 21 and the transmission rod 27 in the rear direction, the predetermined angle P will result the thrust board 26 to rotate in a reverse direction to create self-locking state in the vacuum gate. The first preferred embodiment of the present invention, the vacuum gate is opened in the reverse operating process in according to the above-mentioned close operation process.

Figure 17:
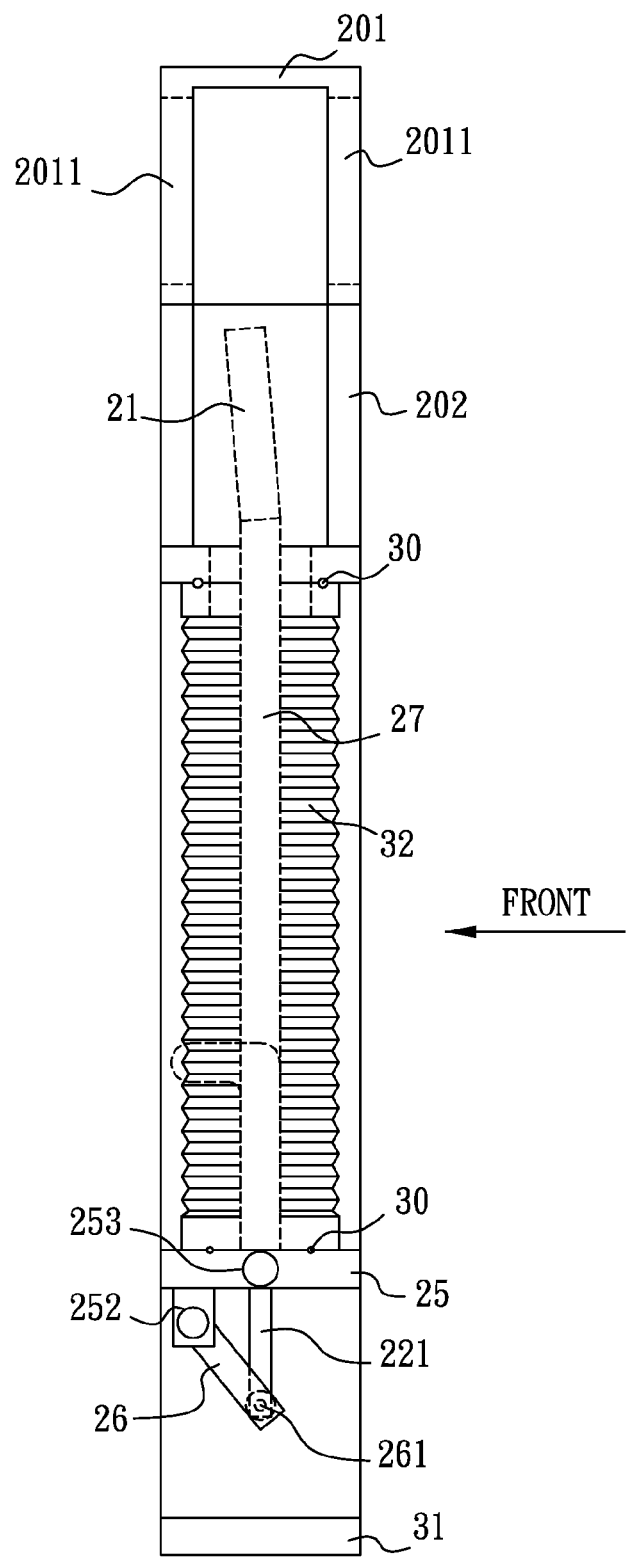
FIGS. 17-19 are schematic views of the operating movement of the vacuum gate at states 1, 2 & 3 in accordance with the second preferred embodiment of the present invention.
Figure 18:
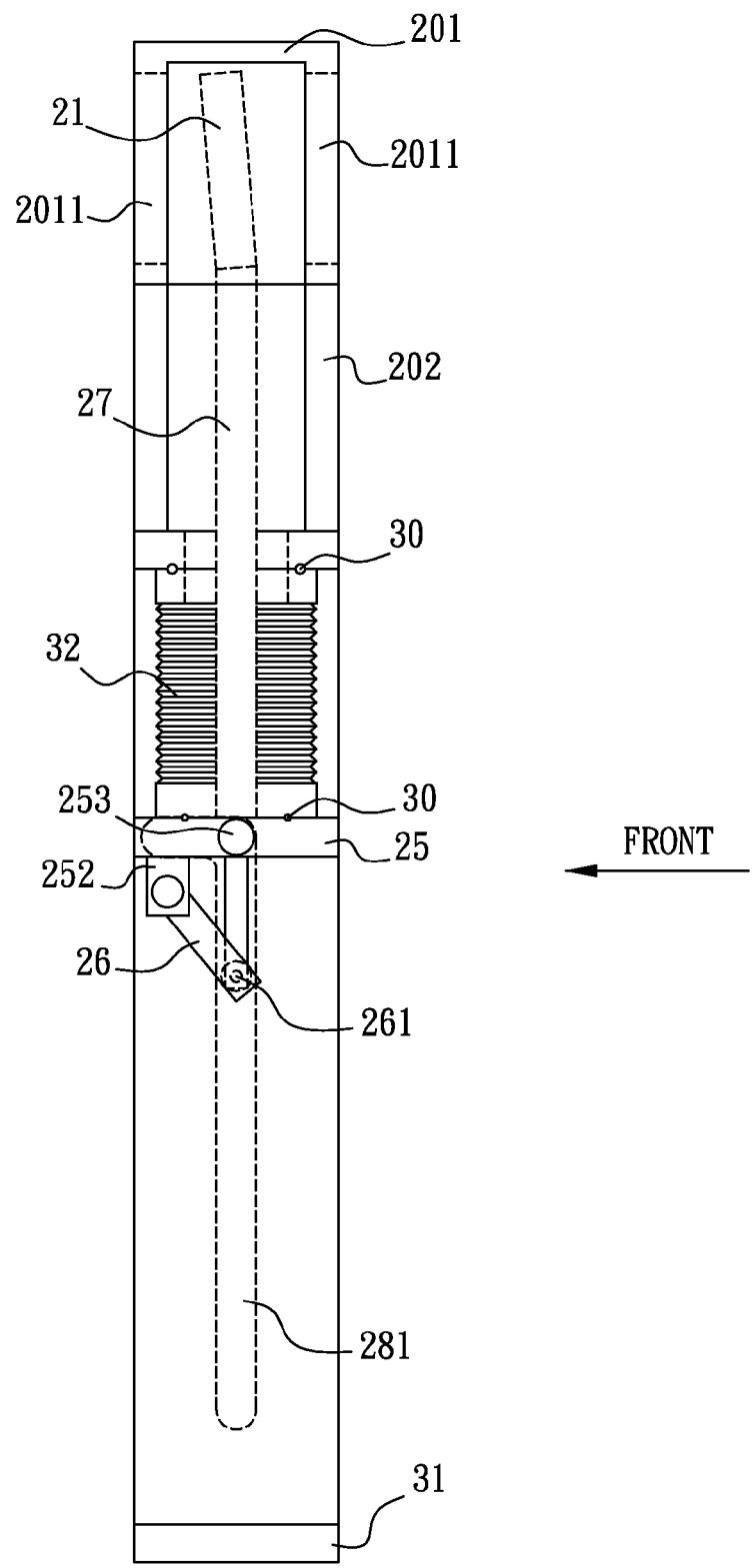
Figure 19:
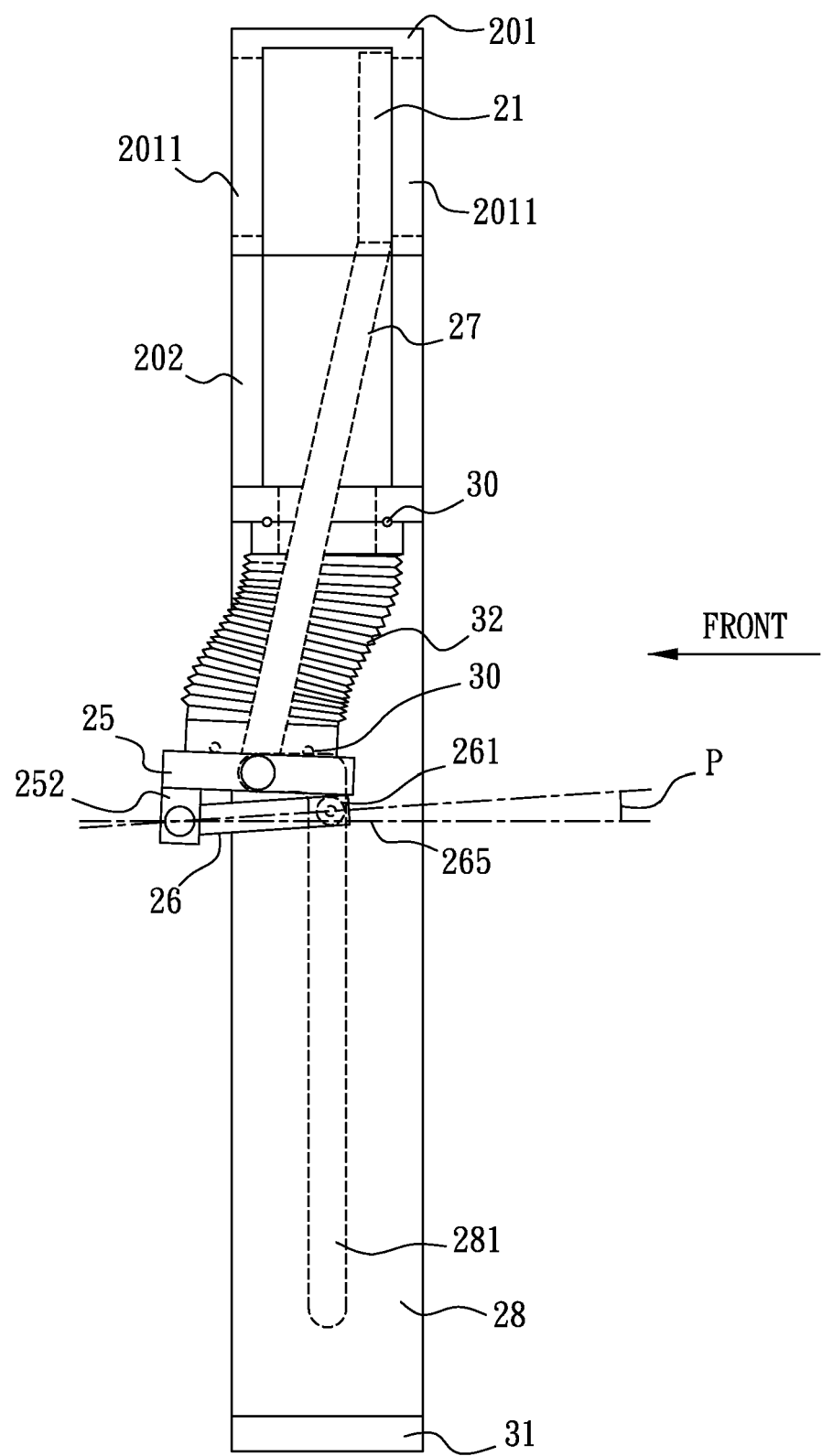

FIG. 17 shows the operating movement of the vacuum gate in state 1 in accordance with the second preferred embodiment of the present invention; FIG. 18 shows the operating movement of the vacuum gate in state 2 in accordance with the second preferred embodiment of the present invention; FIG. 19 shows the operating movements of the vacuum gate in state 3 in accordance with the second preferred embodiment of the present invention. Refer to FIGS. 17-19, when the vacuum gate is in a close state, the piston rod 221 is retrieved back by the pneumatic cylinder 22, and the piston rod 221 pulls the front side of the thrust board 26 to activate the link structural board 25, the first guiding trench 281 guides the first pilot wheel 261 and the third pilot wheels 253 to allow the thrust board 26 and the link structural board 25 to move upward, as a result, the transmission rod 27 and the gate door 21 will be moved upward simultaneously and compressed the bellows 32.

Once the third pilot wheels 253 of the link structural board 25 is reached at the top part of the first guiding trench 281, the pneumatic cylinder 22 will continuously to retrieve the piston rod 221 as shown in FIG. 19. When the third pilot wheels 253 reach the top part of the first guiding trench 281, the upward movement of the piston rod 221 triggers the link structural board 25 to move toward in a rear direction (to the left hand side of FIG. 19) as well as the thrust board 26 moving to the rear direction due to the pivotally coupled part at the protruding part 252 of the link structural board 25. The third pilot wheels 253 of the link structural board 25 are guided by the horizontal trench 283 in such that the bellows 32 bent backward in an angle to allow the link structural board 25 to shift in the rear direction as shown in FIGS. 17-19. Meanwhile, the transmission rods 27 at the top part of the link structural board 25 are bent forward at a pre-set angle to trigger the gate door 21 to air seal/close the valve holes 2011 of the front section of the gate box 20 in such that the vacuum gate of the present invention closes the vacuum chambers.

From FIG. 19, the gap is formed between the coupled portion between the back section of the link structural board 25 and the thrust board 26 when the two boards are assembled together. When the gap between the link structural board 25 and the thrust board 26 is reduced, in other words, the two boards 25 and 26 will be very close to each other when the transmission rods 27 trigger the gate door 21 to close the valve holes, the central line between the pivotally coupled portion of the protruding part 252 of the link structural board 25 & the thrust board 26 and the two first pilot wheels 261 will form a predetermined angle P with respect to a horizontal line 265 of the pivotally couple portion of the protruding part 252 of the link structural board 25 & the thrust board 26. The predetermined angle P between the two boards 26 & 25 in FIG. 19 is specifically designed in such that when the pneumatic cylinder 22 of the vacuum gate in accordance with the second preferred embodiment of the present invention looses its power, the gate door 21 will be still locked. In other words, when a force is used to move the gate door 21 and the transmission rod 27 in the rear direction, the predetermined angle P will cause the thrust board 26 to rotate in a reverse direction to create a self-locking state in the vacuum gate. The second preferred embodiment of the present invention, the vacuum gate is opened in the reverse operating process in according to the above-mentioned close operation process.

Figure 20:
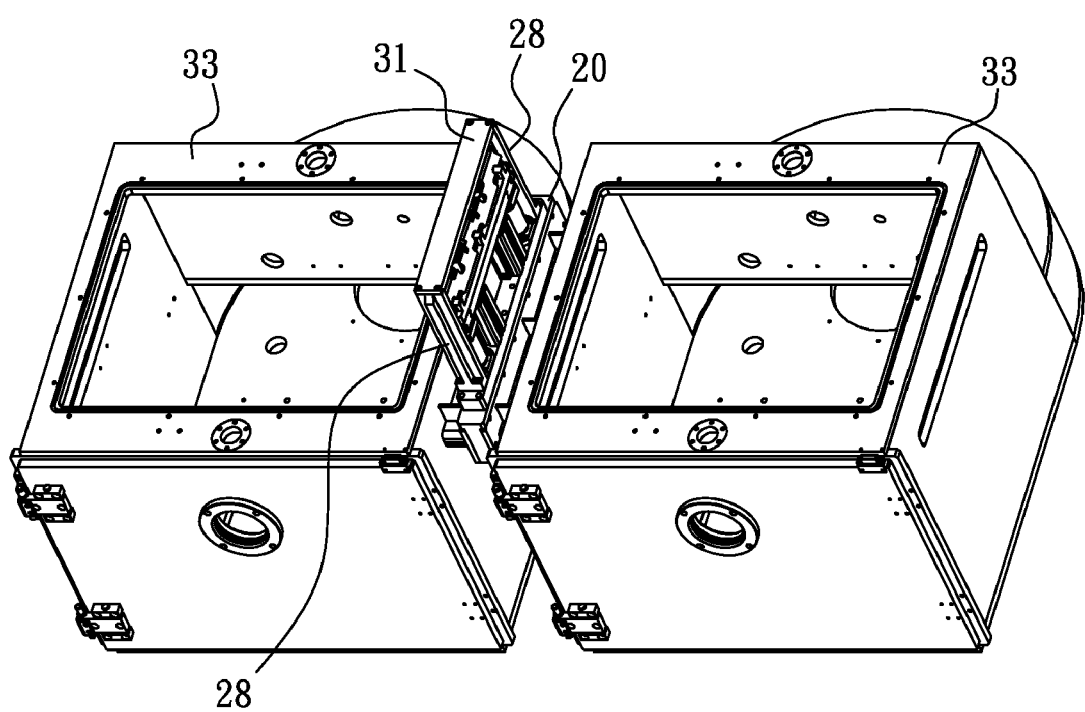
FIG. 20 is a schematic view of operating the vacuum gate in accordance with a third preferred embodiment of the present invention.
Figure 21:
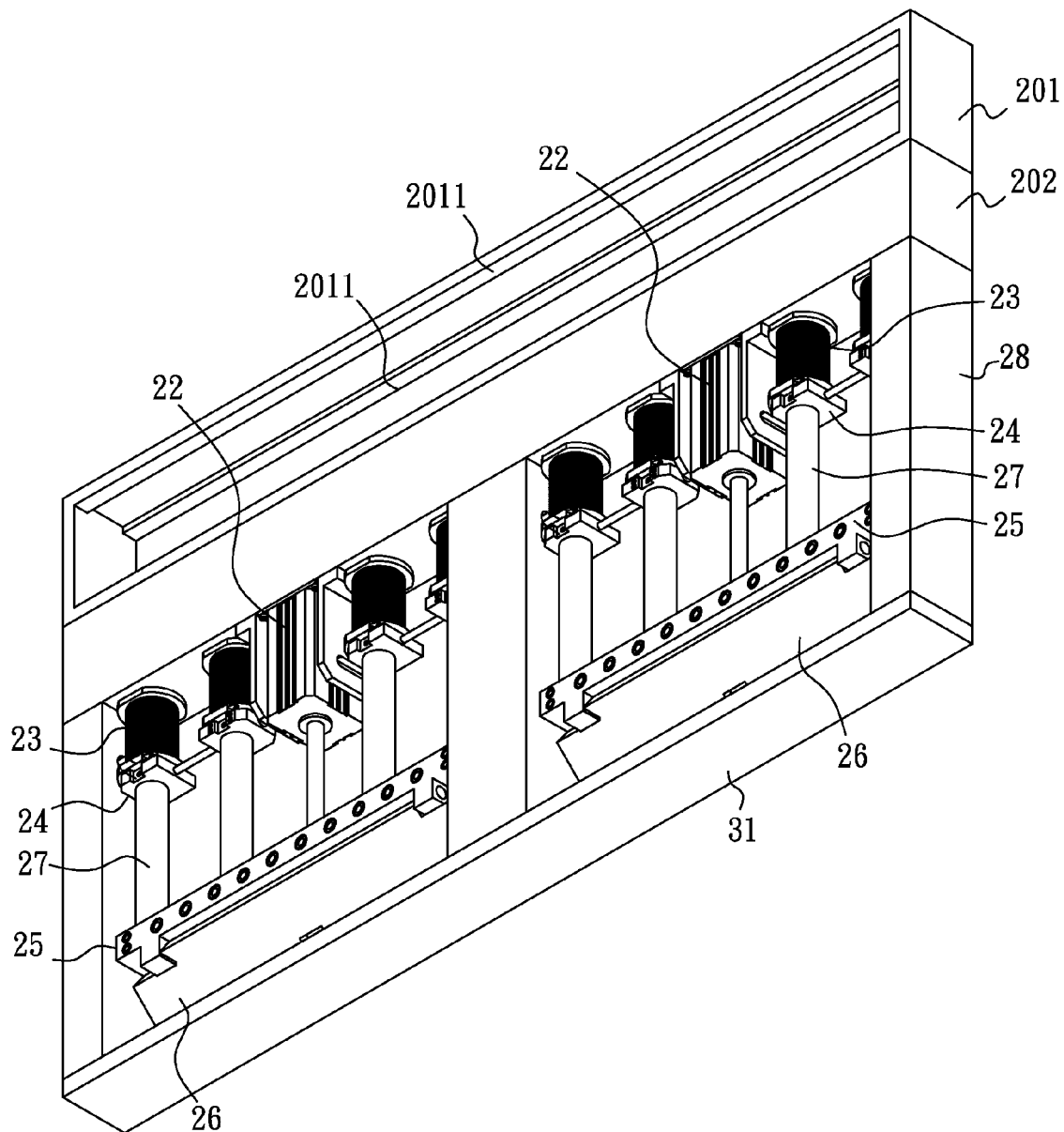
FIG. 21 is a schematic view of a large size of the vacuum gate in accordance with a fourth preferred embodiment of the present invention.

FIG. 20 is a schematic view of operating the vacuum gate in accordance with a third preferred embodiment of the present invention. The vacuum gate of the present invention is installed in the two vacuum chambers 33, wherein the valve holes 2011 of the gate box 20 of the vacuum gate are connected to the two vacuum chambers 33. This embodiment is to demonstrate that the vacuum gate of the present invention can sustain to high differentiation in pressure negatively & positively, and operate without difficulty both in negative pressure condition and positive pressure condition. FIG. 21 is a schematic view of a large size of the vacuum gate in accordance with a fourth preferred embodiment of the present invention. The large size of vacuum gate can be used in a large size of chambers based on the same operating principles and design. The number of the pneumatic cylinder 22 used is increased, and the pneumatic cylinders 22 and flexible sealed tubes 23 are connected in parallel in the large size of vacuum gate.

The vacuum gate of the present invention utilizes the reverse L-shaped of the first guiding trench 281 to guide and allow the gate door 21 to move both in vertical and horizontal directions in such that the vacuum gate can airtight the vacuum chambers and provide enough force to open and close the vacuum chambers even when the vacuum pressure is increased or when the difference in the thrust pressure is increased between the two vacuum chambers (refer to differentiation both in negative pressure condition and positive pressure condition). The design in the vacuum gate of the present invention can prevent the O-rings used in the vacuum gate being worn out or damaged. The design of the present invention can also overcome the shortcoming of the prior art that has to adopt a special valve and a special O-ring for limited application. The specific design of the vacuum gate of the present invention can be enlarged and integrated with different gate boxes to accommodate the large chambers. Further, when the pneumatic cylinder 22 lost its power, the gate door 21 would be in a self-locked position due to the design of the predetermine angle of the pivotally couple portion between the link structural board and the thrust board.

The design of the vacuum gate of the present invention is purely based on mechanical principle. The usage of the mechanical mechanism can reduce the fabrication cost and it also allows the gate valve to sustain the enormous different pressure between the chambers and outside environment. The purpose of the present invention to provide an improved vacuum gate that is purely based on mechanical principle and mechanical mechanism that can drastically reduced the manufacturing cost due to no specific devices and expansive devices are required.

Further, the vacuum gate of the present invention overcomes the shortcoming and the default of the conventional vacuum gates that have insufficient transversal forces to maintain the airtight condition between the vacuum chambers, or between valve and the valve's contact surface of the vacuum chamber. The improved design of the vacuum gate of the present invention resolves the problems in the wedge vacuum valve, such as the wedge valve cannot provide enough force to the latch board resulting the contact surfaces between valves of the vacuum chamber are not airtight and causing air leakage; the similar problem in the parallelogram vacuum gate valve, which also does not have sufficient tensile force of the spring, that the force applied to the board cannot be attached to the latch board to return to the guide track when the valve is opened, as a result, the O-ring is worn out or damaged easily and the closed valve cannot be fastened into an airtight status when the pneumatic cylinder loses its dynamic force; the limited space problem of the HVA valve in its valve housing and restricted applications. All the abovementioned conventional valves have problem of providing enough force to open and close the valve door in the condition when large pressure differentials are being employed. Further, all the conventional valve designs have the problem to airtight the valves completely. The usages of hydraulic and electrical or electronic means of mechanism are problematic and costly, and the maintenance cost is also high on those conventional gate valves. Moreover, the conventional valve designs cannot be interchanged of different types of the flexible sealed tubes 23 or bellows 32 in their gate valve structures. The conventional valve designs are also not suitable for larger size of chambers, unlike the improved vacuum gate of the present invention which can be enlarged based on the same mechanical principle to be utilized in the larger chambers and larger difference vacuum pressure condition.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A vacuum gate, comprising:
  a gate box, having a storing space, wherein valve holes are provided at front and rear portions of the gate box, a plurality of first holes is provided at a bottom portion of the gate box connecting to the storing space, and the valve holes are used respectively to integrate with a vacuum chamber;
  a gate door, installed at the storing space of the gate box;
  a plurality of flexible sealed tubes, wherein top portions of the flexible sealed tubes are connected respectively to the bottom portion of the gate box, and the flexible sealed tubes are connected with first holes of the gate box, at least one swinging device is provided at a bottom part of the flexible sealed tubes to connect the flexible sealed tubes together, and a second pilot wheel is provided at right and left sides of the swinging device;
  at least one pneumatic cylinder, positioned at the bottom portion of the gate box, wherein a piston rod is coupled to a bottom part of the pneumatic cylinder and moves up and down along vertical axis of the pneumatic cylinder;
  a pair of first supporting boards, located at the bottom portion of the gate box, wherein each of the first support boards has a first guiding trench and a second guiding trench, the first guiding trench comprises a long rectangular shaped trench in a vertical direction, and at a top part of the rectangular shaped of trench is connected to a horizontal trench with chamfered edges in a horizontal direction, the second guiding trench is formed in the horizontal direction and is located at the top of the horizontal trench of the first guiding trench, the second pilot wheels are rolled along the second guiding trench in the horizontal direction;
  a link structural board, having at least one second hole and a third pilot wheel located on both sides of the second hole, wherein the two third pilot wheels roll respectively within the first guiding trench in the vertical direction and the horizontal trench in the horizontal direction;
  a thrust board, wherein a gap is formed at a pivotally coupled portion of the thrust board and a backside of the link structural board, a first pilot wheel is located at both sides of the thrust board respectively, and the two first pilot wheels are rolled within the first guiding trench, a piston rod is passed through the second hole and is coupled to one side of the thrust board, a coupled part of the piston rod and thrust board passes a first central line of the two first pilot wheels located on both sides of the thrust board; and
  a plurality of transmission rods, passing through the first holes, the flexible sealed tubes and the swinging device, wherein a top part of the transmission rods are located at the bottom portion of the gate box, and a bottom part of the transmission rods are positioned at a top portion of the link structural board, a connecting portion of the transmission rod and the link structural board passes a second central line of the two third pilot wheels located at both sides of the link structural board, when the third pilot wheels are rolled inside the horizontal trenches respectively, the first central line is shifted to the front of the second central line, and the gate door closes the valve hole positioned at the front portion of the gate box.

2. A vacuum gate, comprising:

a gate box, having a storing space, wherein valve holes are provided at front and rear portions of the gate box, a plurality of first holes is provided at a bottom portion of the gate box connecting to the storing space, and the valve holes are used respectively to integrate with a vacuum chamber;

a gate door, installed at the storing space of the gate box;

at least one pneumatic cylinder, positioned at the bottom portion of the gate box, wherein a piston rod is coupled to a bottom part of the pneumatic cylinder and moves up and down along vertical axis of the pneumatic cylinder;

a pair of first supporting boards, located at the bottom portion of the gate box, wherein each of the first support boards has a first guiding trench, the first guiding trench comprises a long rectangular shaped trench in a vertical direction, and at a top part of the rectangular shaped of trench is connected to a horizontal trench with chamfered edges in a horizontal direction;

a link structural board, having at least one second hole and a third pilot wheel located on both sides of the second hole, wherein the two third pilot wheels roll respectively within the first guiding trench in the vertical direction and the horizontal trench in the horizontal direction;

a plurality of bellows, wherein top parts of the bellows are connected to respectively to the bottom portion of the gate box and to the first holes, bottom parts of the bellows are connected to a top portion of the link structural board;

a thrust board, wherein a gap is formed at a pivotally coupled portion of the thrust board and a backside of the link structural board, a first pilot wheel is located at both sides of the thrust board respectively, and the two first pilot wheels are rolled within the first guiding trenches respectively, a piston rod is passed through the second hole and is coupled to one side of the thrust board, a coupled part of the piston rod and thrust board passes a first central line of the two first pilot wheels located both sides of the thrust board; and a plurality of transmission rods, passing through the first holes and the bellows, wherein a top part of the transmission rods are located at the bottom portion of the gate box, and a bottom part of the transmission rods are positioned at top portion of the link structural board, a connecting portion of the transmission rod and the link structural board passes a second central line of the two third pilot wheels located at both sides of the link structural board, when the third pilot wheels are rolled within the horizontal trenches respectively, the first central line is shifted to the front of the second central line, and the gate door closes the valve hole positioned at the front portion of the gate box.

3. The vacuum gate of claim 1, wherein the gate box further comprises a top body and a bottom body, the valve holes are provided at front and rear portions respectively of the top body, and a connecting top opening is provided at a bottom portion of the top body, a connecting bottom opening is provided at a top portion of the bottom body, and a plurality of the first holes are provided at a bottom portion of the bottom body, the connecting top opening of the top body is integrated with the connecting bottom opening of the bottom body to form the storing space.

4. The vacuum gate of claim 3, wherein an O-ring is used between the connecting top opening and the connecting bottom opening.

5. The vacuum gate of claim 1, wherein an O-ring is provided respectively at connecting parts of the top portions of the flexible sealed tubes and the bottom portions of the gate box.

6. The vacuum gate of claim 2, wherein an O-ring is provided respectively at connecting parts of the bellows and the bottom portions of the gate box.

7. The vacuum gate of claim 1, wherein an O-ring is provided respectively at those connecting parts of bottom portions of the flexible sealed tubes and the transmission rods.

8. The vacuum gate of claim 1, wherein an O-ring is provided respectively at those connecting parts of the bottom portions of the flexible sealed tubes and swinging device, and those connecting parts of the swinging device and the transmission rods.

9. The vacuum gate of claim 2, wherein an O-ring is provided respectively at connecting parts of the bottom parts of the bellows and top portion of the link structural board.

10. The vacuum gate of claim 1, wherein a plurality of second supporting board located at the bottom portion of the gate box, wherein a supporting trench is provided at each second supporting board respectively, and the supporting trench is formed in a horizontal direction in respect of the second supporting board, the second pilot wheels of the swinging devices are rolled within the supporting trench of the second supporting board.

11. The vacuum gate of claim 1, wherein at least one protruding part is provided at the bottom portion of the link structural board for coupling pivotally to the thrust board.

12. The vacuum gate of claim 1, wherein the piston rod is coupled to one side of the thrust board via a shaft.

13. The vacuum gate of claim 1, wherein the bottom parts of the two supporting boards are connected to each other through the link structural board.

14. The vacuum gate of claim 11, wherein the pivotally coupled portion between the protruding part of the link structural board and the thrust board passes through a central line of the two first pilot wheels.

15. The vacuum gate of claim 14, when the link structural board and the thrust board are pushed closely to each other, the central line of the two first pilot wheels will form a predetermined angle with respect to a horizontal line of the pivotally couple portion of the protruding part of the link structural board and the thrust board.

16. The vacuum gate of claim 15, wherein the predetermined angle of the pivotally coupled portion allow the thrust board to rotate in a reverse direction to create a self-locking state in the vacuum gate.

* * * * *